United States Patent
Baldemair et al.

(10) Patent No.: US 11,818,719 B2
(45) Date of Patent: *Nov. 14, 2023

(54) RADIO BASE STATION AND USER EQUIPMENT AND METHODS THEREIN

(71) Applicant: Telefonaktiebolaget LM Ericsson (publ), Stockholm (SE)

(72) Inventors: Robert Baldemair, Solna (SE); David Astely, Stockholm (SE); Dirk Gerstenberger, Stockholm (SE); Daniel Larsson, Lund (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,715

(22) Filed: Nov. 5, 2021

(65) Prior Publication Data

US 2022/0061046 A1 Feb. 24, 2022

Related U.S. Application Data

(63) Continuation of application No. 16/715,433, filed on Dec. 16, 2019, now Pat. No. 11,172,473, which is a
(Continued)

(51) Int. Cl.
*H04W 72/21* (2023.01)
*H04J 11/00* (2006.01)
*H04L 5/00* (2006.01)

(52) U.S. Cl.
CPC .......... *H04W 72/21* (2023.01); *H04J 11/005* (2013.01); *H04J 11/0033* (2013.01); *H04L 5/0019* (2013.01); *H04L 5/0053* (2013.01)

(58) Field of Classification Search
CPC ............... H04W 72/0413; H04W 72/21; H04J 11/0033; H04J 11/005; H04L 5/0019; H04L 5/0053; H04L 5/0055; H04L 5/0007
(Continued)

(56) References Cited

U.S. PATENT DOCUMENTS 6,603,752 B1   8/2003  Saifuddin et al.
7,324,583 B2   1/2008  Hooli et al.
(Continued)

FOREIGN PATENT DOCUMENTS

EP      2139255 A1    12/2009
JP      2008508803 A   3/2008
(Continued)

OTHER PUBLICATIONS

Nokia Siemens Networks et al., "Details for Bock Spread DFT-S-OFDMA" 3GPP TSG RAN WG1 Meeting #62, Aug. 23-27, 2010, pp. 1-6, Madrid, Spain, R1-104429.
(Continued)

*Primary Examiner* — Hirdepal Singh
(74) *Attorney, Agent, or Firm* — COATS & BENNETT, PLLC

(57) ABSTRACT

Embodiments herein include a method in a user equipment (UE) for transmitting uplink control information in time slots of a subframe over a radio channel to a radio base station. The uplink control information is comprised in a block of bits. The UE maps the block of bits to a sequence of complex valued modulation symbols. The UE block spreads the sequence across Discrete Fourier Transform Spread-Orthogonal Frequency Division Multiplexing (DFTS-OFDM) symbols. This is performed by applying a spreading sequence to the sequence of complex valued modulation symbols, to achieve a block spread sequence of
(Continued)

complex valued modulation symbols. The UE further transforms the block-spread sequence, per DFTS-OFDM symbol. This is performed by applying a matrix that depends on a DFTS-OFDM symbol index and/or slot index to the block-spread sequence. The UE also transmits the block spread sequence, as transformed, over the radio channel to the radio base station.

18 Claims, 21 Drawing Sheets

Related U.S. Application Data continuation of application No. 16/033,929, filed on Jul. 12, 2018, now Pat. No. 10,517,079, which is a continuation of application No. 14/802,542, filed on Jul. 17, 2015, now Pat. No. 10,028,261, which is a continuation of application No. 14/134,326, filed on Dec. 19, 2013, now Pat. No. 9,088,979, which is a continuation of application No. 13/119,504, filed as application No. PCT/SE2011/050052 on Jan. 18, 2011, now Pat. No. 8,638,880.

(60) Provisional application No. 61/295,885, filed on Jan. 18, 2010.

(58) Field of Classification Search
USPC ......................................................... 370/329
See application file for complete search history.

(56) References Cited

U.S. PATENT DOCUMENTS

| | | | |
|---|---|---|---|
| 7,492,788 B2* | 2/2009 | Zhang | H04W 52/146 370/545 |
| 7,593,449 B2 | 9/2009 | Shattil | |
| 8,040,867 B2 | 10/2011 | Castelain et al. | |
| 8,325,593 B2 | 12/2012 | Kawamura et al. | |
| 8,363,677 B2 | 1/2013 | Seki et al. | |
| 8,385,467 B2 | 2/2013 | Han et al. | |
| 8,428,019 B2 | 4/2013 | Miki et al. | |
| 8,503,375 B2 | 8/2013 | Malladi et al. | |
| 8,638,880 B2 | 1/2014 | Baldemair et al. | |
| 8,644,378 B2 | 2/2014 | Liu et al. | |
| 8,699,446 B2 | 4/2014 | Kuchi et al. | |
| 8,767,646 B2 | 7/2014 | Han et al. | |
| 8,817,726 B2 | 8/2014 | Seo et al. | |
| 8,824,578 B2 | 9/2014 | Park et al. | |
| 8,830,927 B2 | 9/2014 | Lunttila et al. | |
| 8,908,793 B2 | 12/2014 | Han et al. | |
| 9,088,979 B2 | 7/2015 | Baldemair et al. | |
| 9,485,060 B2 | 11/2016 | Nayeb Nazar et al. | |
| 2008/0051125 A1 | 2/2008 | Muharemovic et al. | |
| 2008/0240269 A1 | 10/2008 | Pajukoski | |
| 2008/0247477 A1 | 10/2008 | Shen et al. | |
| 2008/0279170 A1 | 11/2008 | Malladi et al. | |
| 2008/0287155 A1* | 11/2008 | Xu | H04L 27/2613 455/522 |
| 2008/0131054 A1 | 12/2008 | Tiirola et al. | |
| 2008/0298433 A1 | 12/2008 | Tiirola et al. | |
| 2008/0310540 A1 | 12/2008 | Tiirola et al. | |
| 2009/0022135 A1 | 1/2009 | Papasakellariou et al. | |
| 2009/0207797 A1 | 8/2009 | Shen et al. | |
| 2009/0305741 A1 | 12/2009 | Takeuchi et al. | |
| 2009/0323846 A1 | 12/2009 | Sindhushayana | |
| 2010/0002800 A1 | 1/2010 | Kim et al. | |
| 2010/0254434 A1 | 10/2010 | Iwai et al. | |
| 2011/0134968 A1 | 6/2011 | Han et al. | |
| 2011/0243066 A1 | 10/2011 | Nayeb Nazar et al. | |
| 2011/0261774 A1 | 10/2011 | Lunttila et al. | |
| 2011/0292900 A1 | 12/2011 | Ahn et al. | |
| 2011/0310932 A1 | 12/2011 | Park et al. | |
| 2012/0082113 A1 | 4/2012 | Lee et al. | |
| 2012/0093139 A1 | 4/2012 | Hooli et al. | |
| 2012/0176885 A1 | 7/2012 | Lee et al. | |
| 2012/0236771 A1 | 9/2012 | Luo et al. | |
| 2012/0250523 A1 | 10/2012 | Miki | |
| 2013/0155988 A1 | 6/2013 | Bertrand et al. | |
| 2014/0307675 A1* | 10/2014 | Xu | H04W 52/325 370/329 |
| 2016/0065347 A1 | 3/2016 | Nakao et al. | |
| 2017/0238309 A1 | 8/2017 | Han et al. | |
| 2017/0303263 A1 | 10/2017 | Islam et al. | |
| 2019/0158253 A1* | 5/2019 | Kwon | H04L 1/1614 |

FOREIGN PATENT DOCUMENTS

| | | | |
|---|---|---|---|
| JP | 2009111780 | A | 5/2009 |
| JP | 2009239539 | A | 10/2009 |
| JP | 2009302614 | A | 12/2009 |
| RU | 2262193 | C2 | 10/2005 |
| RU | 2336637 | C2 | 10/2008 |
| WO | 2006015108 | A2 | 2/2006 |
| WO | 2008126623 | A1 | 10/2008 |
| WO | 2009057302 | A1 | 5/2009 |
| WO | 2009131345 | A1 | 10/2009 |
| WO | 2009134082 | A2 | 11/2009 |

OTHER PUBLICATIONS

Nakao, S. et al., "Performance enhancement of E-UTRA uplink control channel in fast fading environments", 2009 IEEE 69th Vehicular Technology Conference, Apr. 26, 2009, pp. 1-5, Barcelona, Spain.

Peng, X. et al., "Block Spread IFDMA: An Improved Uplink Transmission Scheme", 18th Annual IEEE International Symposium on Personal, Indoor and Mobile Radio Communications (PIMRC '07), Sep. 1, 2007, pp. 1-4.

Jungnickel, V. et al., "SC-FDMA Waveform Design, Performance, Power Dynamics and Evolution to MIMO", IEEE International Conference on Portable Information Devices, May 1, 2007, pp. 1-6.

Astely, D. et al., "LTE: The Evolution of Mobile Broadband", IEEE Communications Magazine, Apr. 2009, pp. 44-51, vol. 47, No. 4.

Yang, H. et al., "Semi-blind multi-user detection for LTE PUCCH", Wireless Communications and Networking Conference, 2009, IEEE, pp. 1-5, Apr. 5, 2009, Piscataway, NJ.

3rd Generation Partnership Project, "Technical Specification Group Radio Access Network; Evolved Universal Terrestrial Radio Access (E-UTRA); Physical Channels and Modulation (Release 9)", 3GPP TS 36.211 V9.0.0, Dec. 2009, pp. 1-85.

3rd Generation Partnership Project, "Technical Specification Group Radio Access Network; Evolved Universal Terrestrial Radio Access (E-UTRA); Multiplexing and channel coding (Release 9)", 3GPP TS 36.212 V9.0.0, Dec. 2009, pp. 1-61.

3rd Generation Partnership Project, "Technical Specification Group Radio Access Network; Physical channels and mapping of transport channels onto physical channels (FDD) (Release 9)", 3GPP TS 25.211 V9.1.0, Dec. 2009, pp. 1-58.

Ericsson, "Introduction of Rel-10 LTE-Advanced features in 36.211", 3GPP TSG-RAN Meeting #63, Jacksonville, USA, Nov. 15-19, 2010, pp. 1-101, R1-106555, 3GPP.

Nokia, "Multiplexing of L1-L2 Control Signalling when UE has no data to transmit", 3GPP TSG RAN WG1 #46bis, Seoul, Korea, Oct. 9-13, 2006, pp. 1-7, R1-062841, 3GPP.

NTT Docomo, et al., "On PUCCH Structure for CQI Report", 3GPP TSG RAN WG1 Meeting #51, Jeju, Korea, Nov. 5-9, 2007, pp. 1-7, R1-074812, 3GPP.

* cited by examiner

| Combination | No MIMO | MIMO | |
|---|---|---|---|
| | | 1st transport block | 2nd transport block |
| 1 | ACK | ACK | ACK |
| 2 | NAK | ACK | NAK |
| 3 | DTX | NAK | ACK |
| 4 | | NAK | NAK |
| 5 | | DTX | |

Fig. 5

RADIO BASE STATION AND USER EQUIPMENT AND METHODS THEREIN

RELATED APPLICATIONS

The present application is a continuation of U.S. patent application Ser. No. 16/715,433, which was filed on Dec. 16, 2019, and issued as U.S. Pat. No. 11,172,473 on Nov. 9, 2021, which is a continuation of U.S. patent application Ser. No. 16/033,929, which was filed on Jul. 12, 2018, and issued as U.S. Pat. No. 10,517,079 on Dec. 24, 2019, which is a continuation of U.S. patent application Ser. No. 14/802,542, which was filed on Jul. 17, 2015, and issued as U.S. Pat. No. 10,028,261 on Jul. 17, 2018, which is a continuation of U.S. patent application Ser. No. 14/134,326, which was filed on Dec. 19, 2013, and issued as U.S. Pat. No. 9,088,979 on Jul. 21, 2015, which is a continuation of U.S. patent application Ser. No. 13/119,504, which was filed on Mar. 17, 2011, and issued as U.S. Pat. No. 8,638,880 on Jan. 28, 2014, which is a national stage application of PCT/SE2011/050052, filed Jan. 18, 2011, and claims benefit of U.S. Provisional Application 61/295,885, filed Jan. 18, 2010, the disclosures of each of which are incorporated herein by reference in their entirety.

TECHNICAL FIELD

Embodiments herein relate to a radio base station, a user equipment and methods therein. In particular, embodiments herein relate to transmission of uplink control information comprised in a block of bits over a radio channel to the radio base station.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/ Enhanced Data rate for GSM Evolution (GSM/EDGE), Worldwide Interoperability for Microwave Access (WiMax), and Ultra Mobile Broadband (UMB), just to mention a few.

Long Term Evolution (LTE) is a project within the 3rd Generation Partnership Project (3GPP) to evolve the WCDMA standard towards the fourth generation of mobile telecommunication networks. In comparisons with WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE is a Frequency Division Multiplexing technology wherein Orthogonal Frequency Division Multiplexing (OFDM) is used in a downlink (DL) transmission from a radio base station to a user equipment. Single Carrier-Frequency Domain Multiple Access (SC-FDMA) is used in an uplink (UL) transmission from the user equipment to the radio base station. Services in LTE are supported in the packet switched domain. The SC-FDMA used in the uplink is also referred to as Discrete Fourier Transform Spread (DFTS)-OFDM.

The basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis.

In the time domain, LTE downlink transmissions are organized into radio frames of 10 ms, each radio frame comprising ten equally-sized subframes, #0-#9, each with a $T_{subframe}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

Downlink transmissions are dynamically scheduled, i.e., in each subframe the base station or radio base station transmits control information about to which user equipments or terminals data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols used for control signaling is illustrated in FIG. 3 and denoted as control region. The resource elements used for control signaling are indicated with wave-formed lines and resource elements used for reference symbols are indicated with diagonal lines. Frequencies f or subcarriers are defined along an z-axis and symbols are defined along an x-axis.

LTE uses hybrid-Automatic Repeat Request (ARQ), where, after receiving downlink data in a subframe, the user equipment attempts to decode it and reports to the radio base station using uplink control signaling whether the decoding was successful by sending an Acknowledgement (ACK) if successful decoding or a "non Acknowledgement" (NACK) if not successful decoding. In case of an unsuccessful decoding attempt, the radio base station may retransmit the erroneous data.

Uplink control signaling from the user equipment or terminal to the base station or radio base station comprises
- hybrid-ARQ acknowledgements for received downlink data;
- user equipment or terminal reports related to the downlink channel conditions, used as assistance for the downlink scheduling;
- scheduling requests, indicating that a user equipment or terminal needs uplink resources for uplink data transmissions.

Uplink control information may be transmitted in two different ways:
- on the Physical Uplink shared Channel (PUSCH). If the user equipment or terminal has been assigned resources for data transmission in the current subframe, uplink control information, including hybrid-ARQ acknowledgements, is transmitted together with data on the PUSCH.
- on the Physical Uplink Control Channel (PUCCH). If the user equipment or terminal has not been assigned resources for data transmission in the current subframe, uplink control information is transmitted separately on PUCCH, using resource blocks specifically assigned for that purpose.

Herein the focus is on the latter case, i.e. where Layer1/Layer2 (L1/L2) control information, exemplified by channel-status reports, hybrid-ARQ acknowledgements, and scheduling requests, is transmitted in uplink resources, i.e. in the resource blocks, specifically assigned for uplink L1/L2 control information on the Physical Uplink Control Channel (PUCCH). Layer 1 comprises a physical layer and Layer 2 comprises the data link layer. As illustrated in FIG. 4, PUCCH resources 41,42 are located at the edges of the total available cell uplink system bandwidth. Each such resource comprises twelve "subcarriers", i.e. it comprises one resource block, within each of the two slots of an uplink subframe. In order to provide frequency diversity, these frequency resources are frequency hopping on the slot boundary, as illustrated by the arrow, i.e. within a subframe there is one "resource" 41 comprising 12 subcarriers at the upper part of the spectrum within a first slot of the subframe and an equally sized resource 42 at the lower part of the spectrum during a second slot of the subframe or vice versa. If more resources are needed for the uplink L1/L2 control signaling, e.g. in case of very large overall transmission bandwidth supporting a large number of users, additional resource blocks may be assigned next to the previously assigned resource blocks. Frequencies f or subcarriers are defined along an z-axis and symbols are defined along an x-axis.

The reasons for locating the PUCCH resources at the edges of the overall available spectrum are:

Together with the frequency hopping described above, the location of the PUCCH resources at the edges of the overall available spectrum maximizes the frequency diversity experienced by the control signaling.

Assigning uplink resources for the PUCCH at other positions within the spectrum, i.e. not at the edges, would have fragmented the uplink spectrum, making it impossible to assign very wide transmission bandwidths to single mobile user equipment or terminal and still retain the single-carrier property of the uplink transmission.

The bandwidth of one resource block during one subframe is too large for the control signaling needs of a single user equipment or terminal. Therefore, to efficiently exploit the resources set aside for control signaling, multiple user equipments or terminals may share the same resource block. This is done by assigning the different user equipments or terminals different orthogonal phase rotations of a cell-specific length-12 frequency-domain sequence.

The resource used by a PUCCH is therefore not only specified in the time-frequency domain by the resource-block pair, but also by the phase rotation applied. Similarly to the case of reference signals, there are up to twelve different phase rotations specified, providing up to twelve different orthogonal sequences from each cell-specific sequence. However, in the case of frequency-selective channels, not all the twelve phase rotations may be used if orthogonality is to be retained. Typically, up to six rotations are considered usable in a cell.

As mentioned above, uplink L1/L2 control signaling includes hybrid-ARQ acknowledgements, channel-status reports and scheduling requests. Different combinations of these types of messages are possible, using one of two available PUCCH formats, capable of carrying different number of bits.

PUCCH format 1. There are actually three formats, 1, 1a, and 1b in the LTE specifications, although herein they are all referred to as format 1 for simplicity.

PUCCH format 1 is used for hybrid-ARQ acknowledgements and scheduling requests. It is capable of carrying up to two information bits in addition to Discontinuous Transmission (DTX). If no information transmission was detected in the downlink, no acknowledgement is generated, also known as DTX. Hence, there are 3 or 5 different combinations, depending on whether MIMO was used on the downlink or not. This is illustrated in FIG. 5. In col 51 the combination index is denoted, in col 52 the ARQ information sent when no MIMO is used is disclosed, and in col 53 the ARQ information when MIMO is used when a first transport block and a second transport block are received is shown.

PUCCH format 1 uses the same structure in the two slots of a subframe, as illustrated in FIG. 6. For transmission of a hybrid-ARQ acknowledgement (ACK), the single hybrid-ARQ acknowledgement bit is used to generate a Binary Phase-Shift Keying (BPSK) symbol, in case of downlink spatial multiplexing the two acknowledgement bits are used to generate a Quadrature Phase Shift Keying (QPSK) symbol. For a scheduling request, on the other hand, the BPSK/QPSK symbol is replaced by a constellation point treated as negative acknowledgement at the radio base station or evolved NodeB (eNodeB). Each BPSK/QPSK symbol is multiplied with a length-12 phase rotated sequence. These are then weighted with a length-4 sequence before transformed in an IFFT process. Phase shifts vary on SC-FDMA or DFTS-OFDM symbol level. The reference symbols (RS) are weighted with a length-3 sequence. The modulation symbol is then used to generate the signal to be transmitted in each of the two PUCCH slots. BPSK modulation symbols, QPSK modulation symbols, and complex valued modulation symbols are examples of modulation symbols.

For PUCCH format 2, there are also three variants in the LTE specifications, formats 2, 2a and 2b, where the last two formats are used for simultaneous transmission of hybrid-ARQ acknowledgements as discussed later in this section. However, for simplicity, they are all referred to as format 2 herein.

Channel-status reports are used to provide the radio base station or eNodeB with an estimate of the channel properties at the user equipment or terminal in order to aid channel-dependent scheduling. A channel-status report comprises multiple bits per subframe. PUCCH format 1, which is capable of at most two bits of information per subframe, can obviously not be used for this purpose. Transmission of channel-status reports on the PUCCH is instead handled by PUCCH format 2, which is capable of multiple information bits per subframe.

PUCCH format 2, illustrated for normal cyclic prefix in FIG. 7, is based on a phase rotation of the same cell-specific sequence as format 1, i.e. length-12 phase rotated sequence that is varying per SC-FDMA or DFTS-OFDM symbol. The information bits are block coded, QPSK modulated, each QPSK symbol b0-b9 from the coding is multiplied by the phase rotated length-12 sequence and all SC-FDMA or DFTS-OFDM symbols are finally IFFT processed before transmitted.

In order to meet the upcoming International Mobile Telecommunications (IMT)-Advanced requirements, 3GPP is currently standardizing LTE Release 10 also known as LTE-Advanced. One property of Release 10 is the support of bandwidths larger than 20 MHz while still providing backwards compatibility with Release 8. This is achieved by aggregating multiple component carriers, each of which can be Release 8 compatible, to form a larger overall bandwidth to a Release 10 user equipment. This is illustrated in FIG. 8, where five 20 MHz are aggregated into 100 MHz.

In essence, each of the component carriers in FIG. 8 is separately processed. For example, hybrid ARQ is operated separately on each component carrier, as illustrated in FIG. 9. For the operation of hybrid-ARQ, acknowledgements informing the transmitter on whether the reception of a transport block was successful or not is required. A straightforward way of realizing this is to transmit multiple acknowledgement messages, one per component carrier. In case of spatial multiplexing, an acknowledgement message would correspond to two bits as there are two transport blocks on a component carrier in this case already in the first release of LTE. In absence of spatial multiplexing, an acknowledgement message is a single bit as there is only a single transport block per component carrier. Each flow F1-Fi illustrates a data flow to the same user. Radio Link control (RLC) for each received data flow is performed on the RLC layer. In the Medium Access Control (MAC) layer MAC multiplexing and HARQ processing is performed on the data flow. In the physical (PHY) layer the coding and OFDM modulation of the data flow is performed.

Transmitting multiple hybrid-ARQ acknowledgement messages, one per component carrier, may in some situations be troublesome. If the current LTE Frequency Division Multiplex (FDM) uplink control signaling structures are to be reused, at most two bits of information may be sent back to the radio base station or eNodeB using PUCCH format 1.

One possibility is to bundle multiple acknowledgement bits into a single message. For example, ACK could be signaled only if all transport blocks on all component carriers are correctly received in a given subframe, otherwise a NACK is fed back. A drawback of this is that some transport blocks might be retransmitted even if they were correctly received, which could reduce performance of the system.

Introducing a multi-bit hybrid-ARQ acknowledgement format is an alternative solution. However, in case of multiple downlink component carriers, the number of acknowledgement bits in the uplink may become quite large. For example, with five component carriers, each using MIMO, there are $5^5$ different combinations, keeping in mind that the DTX is preferably accounted for as well, requiring at least $\log_2(5^5) \approx 11.6$ bits. The situation can get even worse in Time Division Duplex (TDD), where multiple downlink subframes may need to be acknowledged in a single uplink subframe. For example, in a TDD configuration with 4 downlink subframes and 1 uplink subframe per 5 ms, there are $5^{5 \cdot 4}$ combinations, corresponding to more than 46 bits of information.

Currently, there is no PUCCH format in LTE specified capable of carrying such a large number of bits.

SUMMARY

An object of embodiments herein is to provide a mechanism that enables high transmission performance in a radio communications network in an efficient manner.

According to a first aspect of embodiments herein the object is achieved by a method in a user equipment for transmitting uplink control information in time slots in a subframe over a radio channel to a radio base station. The radio channel is arranged to carry uplink control information and the user equipment and radio base station are comprised in a radio communications network. The uplink control information is comprised in a block of bits.

The user equipment maps the block of bits to a sequence of complex valued modulation symbols. The user equipment also block spreads the sequence of complex valued modulation symbols across Discrete Fourier Transform Spread-Orthogonal Frequency Division Multiplexing (DFTS-OFDM) symbols. This is performed by applying a spreading sequence to the sequence of complex valued modulation symbols, to achieve a block spread sequence of complex valued modulation symbols. The user equipment further transforms the block-spread sequence of complex valued modulation symbols per DFTS-OFDM symbol. This is performed by applying a matrix that depends on a DFTS-OFDM symbol index and/or slot index to the block-spread sequence of complex valued modulation symbols. The user equipment also transmits the block spread sequence of complex valued modulation symbols that has been transformed over the radio channel to the radio base station.

According to another aspect of embodiments herein the object is achieved by a user equipment for transmitting uplink control information in time slots in a subframe over a radio channel to a radio base station. The radio channel is arranged to carry uplink control information, and the uplink control information is comprised in a block of bits.

The user equipment comprises a mapping circuit configured to map the block of bits to a sequence of complex valued modulation symbols. Also, the user equipment comprises a block spreading circuit configured to block spread the sequence of complex valued modulation symbols across DFTS-OFDM symbols by applying a spreading sequence to the sequence of complex valued modulation symbols, to achieve a block spread sequence of complex valued modulation symbols. Furthermore, the user equipment comprises a transforming circuit configured to transform the block-spread sequence of complex valued modulation symbols per DFTS-OFDM symbol. This is done by applying a matrix that depends on a DFTS-OFDM symbol index and/or slot index to the block-spread sequence of complex valued modulation symbols. The user equipment also comprises a transmitter configured to transmit the block spread sequence of complex valued modulation symbols that has been transformed over the radio channel to the radio base station.

According to another aspect of embodiments herein the object is achieved by a method in a radio base station for receiving uplink control information in time slots in a subframe over a radio channel from a user equipment. The radio channel is arranged to carry uplink control information and the uplink control information is comprised in a block of bits. The user equipment and radio base station are comprised in a radio communications network.

The radio base station receives a sequence of complex valued modulation symbols. The radio base station also OFDM demodulates the sequence of complex valued modulation symbols. The radio base station also transforms, per DFTS-OFDM symbol, the sequence of complex valued modulation symbols that has been OFDM demodulated by applying a matrix that depends on a DFTS-OFDM symbol index and/or slot index to the OFDM demodulated sequence of complex valued modulation symbols.

The radio base station further despreads the sequence of complex valued modulation symbols that has been OFDM demodulated and transformed with a despreading sequence. The radio base station also maps the despread sequence of complex valued modulation symbols that has been OFDM demodulated and transformed, to the block of bits.

According to another aspect of embodiments herein the object is achieved by a radio base station for receiving uplink control information in time slots in a subframe over a radio channel from a user equipment. The radio channel is arranged to carry uplink control information, and the uplink control information is comprised in a block of bits. The radio base station comprises a receiver configured to receive a sequence of complex valued modulation symbols. The radio base station also comprises an OFDM demodulating circuit configured to OFDM demodulate the sequence of complex valued modulation symbols. The radio base station further comprises a transforming circuit configured to transform, per DFTS-OFDM symbol, the sequence of complex valued modulation symbols that has been OFDM demodulated by applying a matrix that depends on a DFTS-OFDM symbol index and/or slot index to the OFDM demodulated sequence of complex valued modulation symbols. The radio base station also comprises a block despreading circuit configured to block despread the sequence of complex valued modulation symbols that has been OFDM demodulated and transformed, with a despreading sequence. Furthermore, the radio base station comprises a mapping circuit configured to map the despread sequence of complex valued modulation symbols that has been OFDM demodulated and transformed, to the block of bits.

Thus, the inter-cell interference is reduced since the matrix or matrices transforms the block spread sequence of complex valued modulation symbols per DFTS-OFDM symbol and thereby increases interference suppression.

According to another aspect of embodiments herein the object is achieved by a method in a terminal for transmitting uplink control information in a slot in a subframe over a channel to a base station in a wireless communication system. The uplink control information is comprised in a code word. The terminal maps the code word to modulation symbols. The terminal block spreads the modulation symbols across DFTS-OFDM symbols by repeating the modulation symbols for each DFTS-OFDM symbol and applying a block spreading sequence of weight factors to the repeated modulation symbols to achieve a respective weighted copy of the modulation symbols for each DFTS-OFDM symbol. The terminal then transforms, for each DFTS-OFDM symbol, the respective weighted copy of the modulation symbols by applying a matrix that depends on a DFTS-OFDM symbol index and/or slot index to the respective weighted copy of the modulation symbols. The terminal then transmits, on or within each DFTS-OFDM symbol, the respective weighted copy of the modulation symbols that has been transformed to the base station.

In some embodiments herein, a transmission format is provided wherein a code word or block of bits corresponding to uplink control information from all configured or activated component carriers of a single user is mapped to modulation symbols such as a sequence of complex valued modulation symbols and block spread over DFTS-OFDM symbols using a spreading sequence. The symbol sequence within one DFTS-OFDM symbol is then transformed and transmitted within the one DFTS-OFDM symbol. Multiplexing of users is enabled with block spreading, i.e. the same signal or symbol sequence is spread across all DFTS-OFDM symbols within one slot or subframe and the transformation per DFTS-OFDM symbol reduces the inter-cell interference.

BRIEF DESCRIPTION OF THE DRAWINGS

Embodiments will now be described in more detail in relation to the enclosed drawings, in which:

FIG. 5 is a table defining combinations of HARQ information.

DETAILED DESCRIPTION

Figure 1:
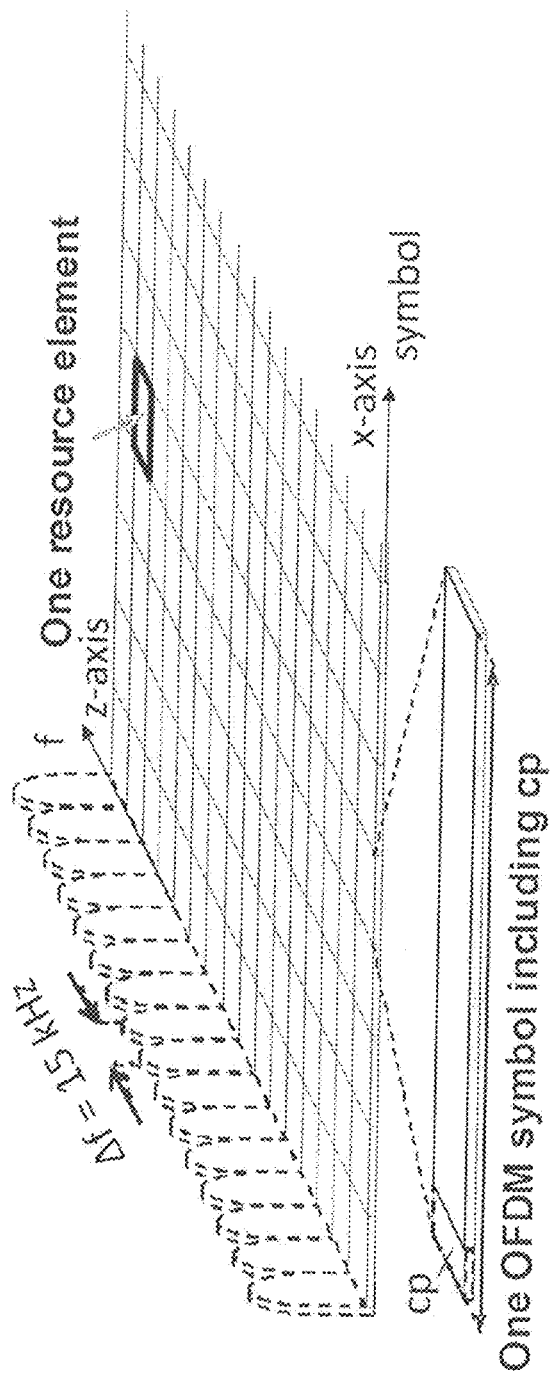
FIG. 1 is a block diagram depicting resources in a frequency-time grid.
Figure 2:
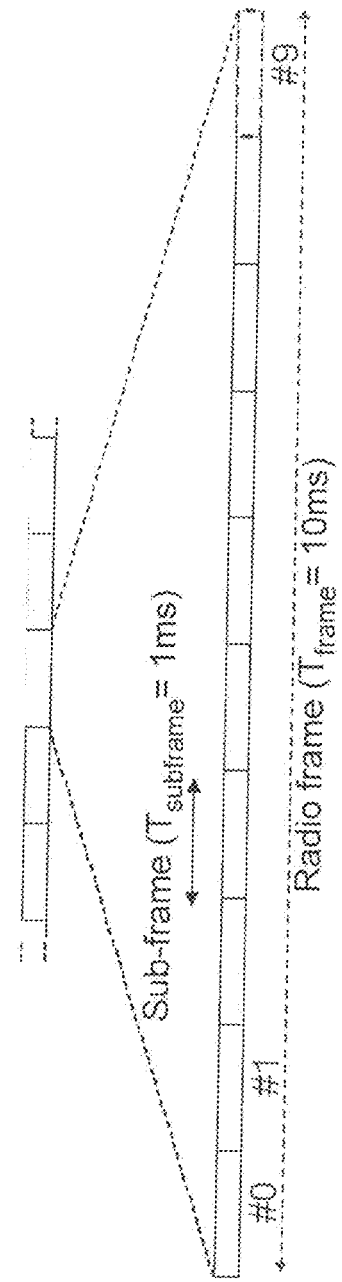
FIG. 2 is a block diagram depicting a LTE time-domain structure of a radio frame.
Figure 3:
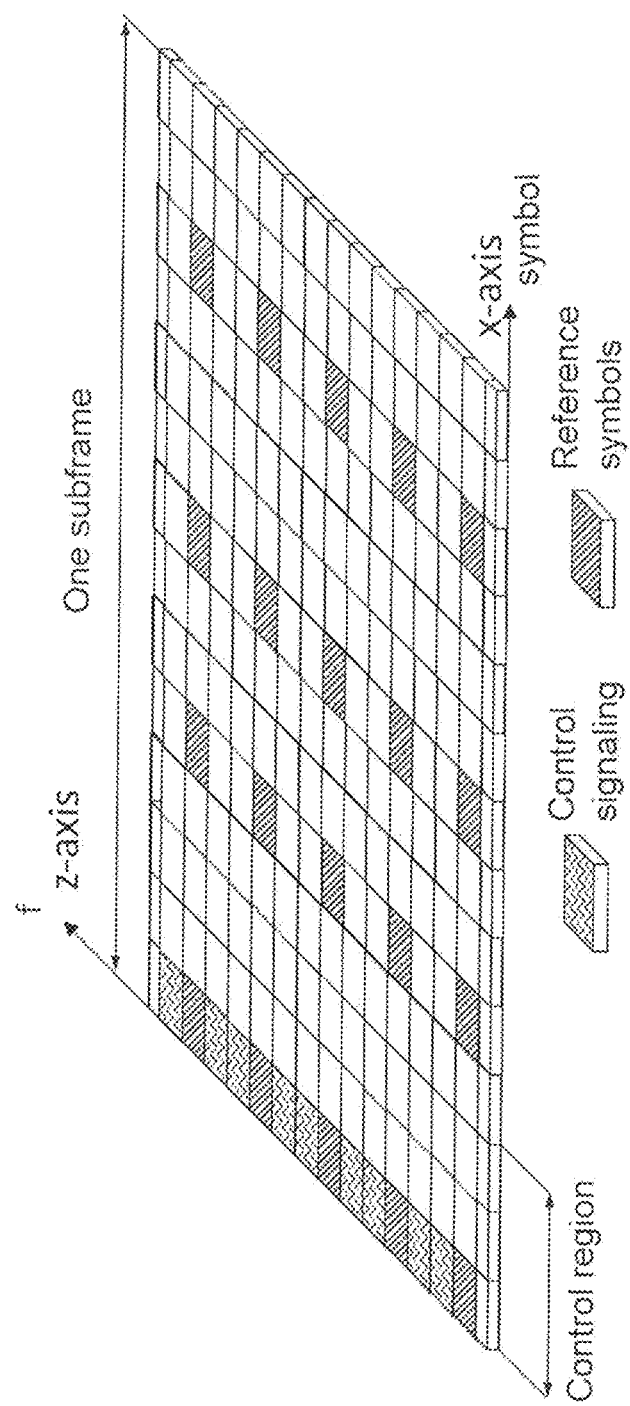
FIG. 3 is a block diagram depicting symbols distributed over a downlink subframe.
Figure 4:
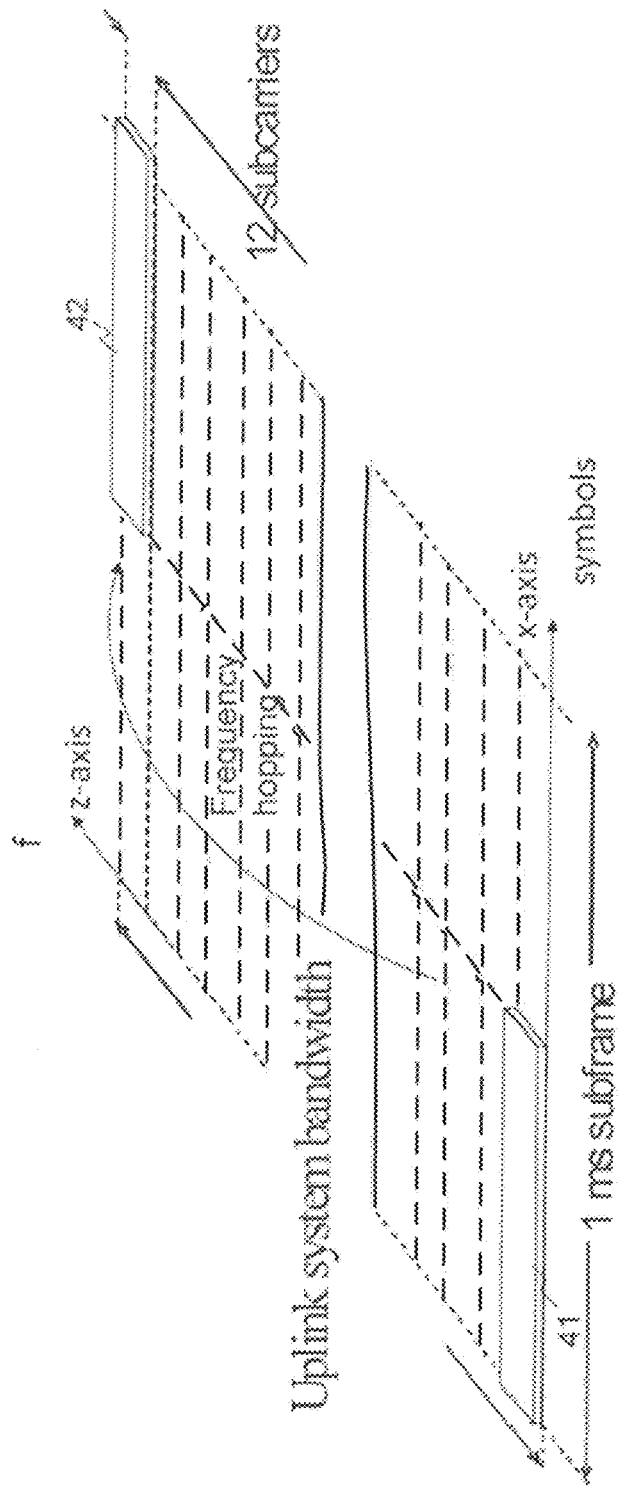
FIG. 4 is a block diagram depicting Uplink L1/L2 control signalling transmission on PUCCH.
Figure 6:
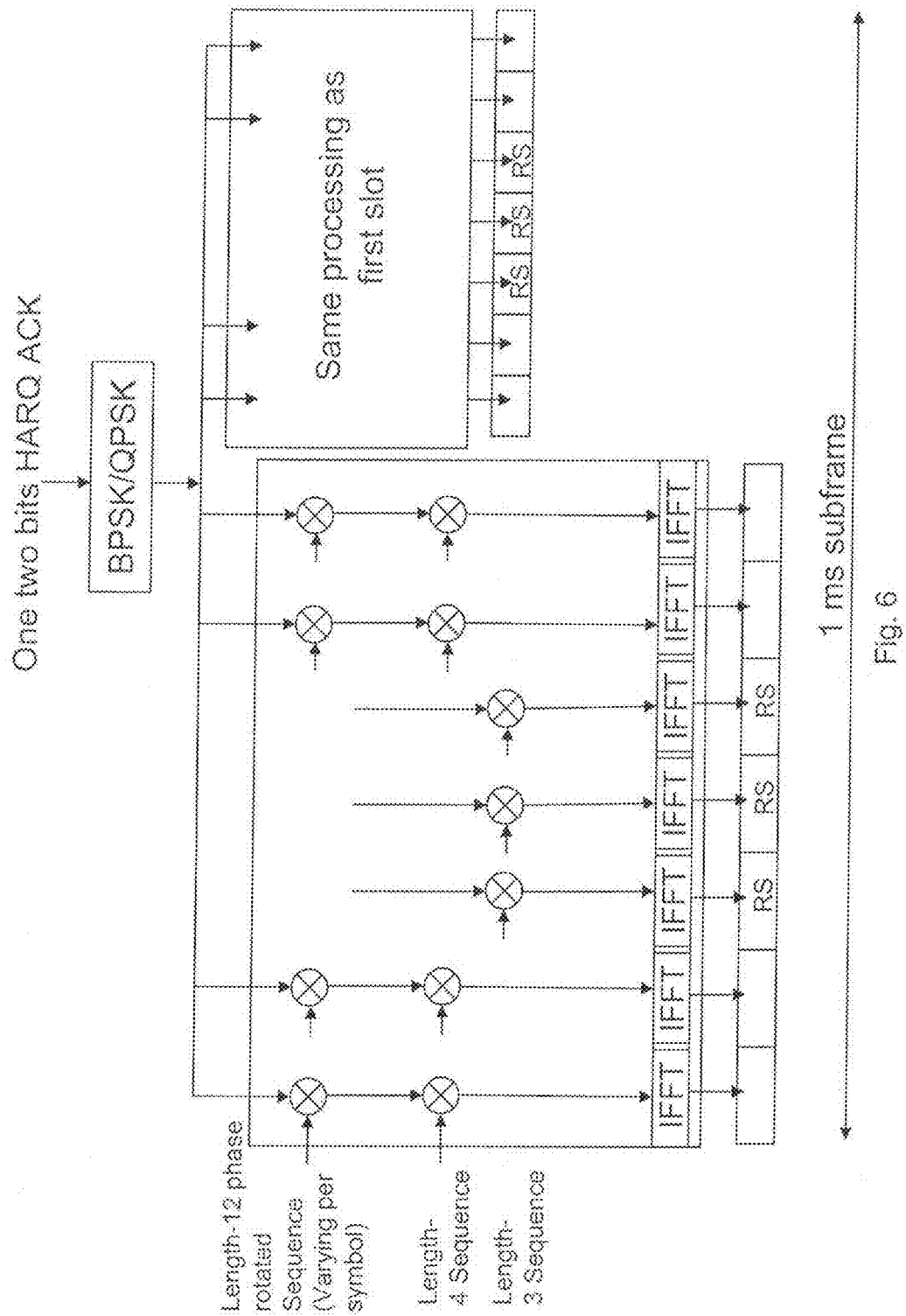
FIG. 6 is a block diagram of PUCCH format 1 with normal length of cyclic prefix.
Figure 7:
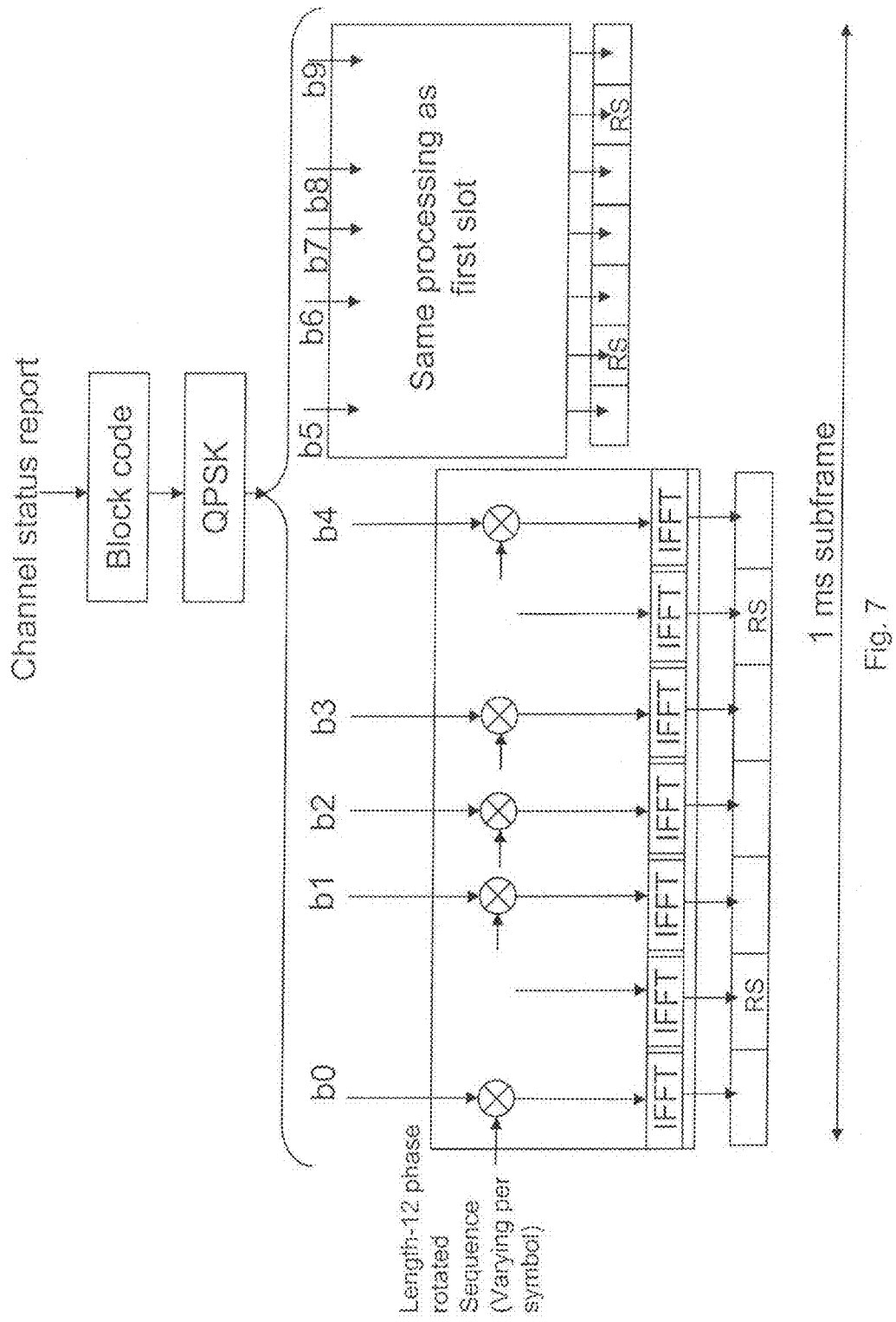
FIG. 7 is a block diagram of PUCCH format 2 with normal length of cyclic prefix.
Figure 8:
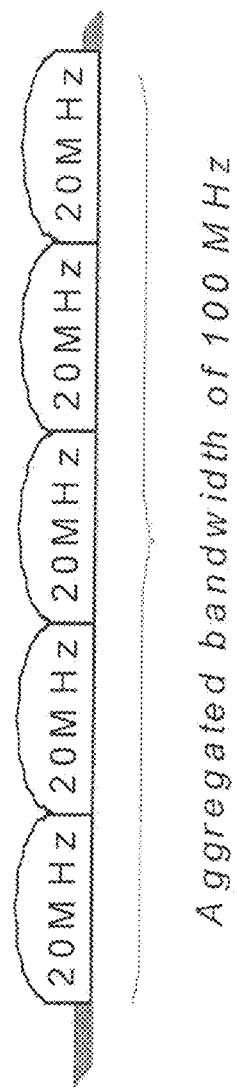
FIG. 8 is a block diagram depicting carrier aggregation.
Figure 9:
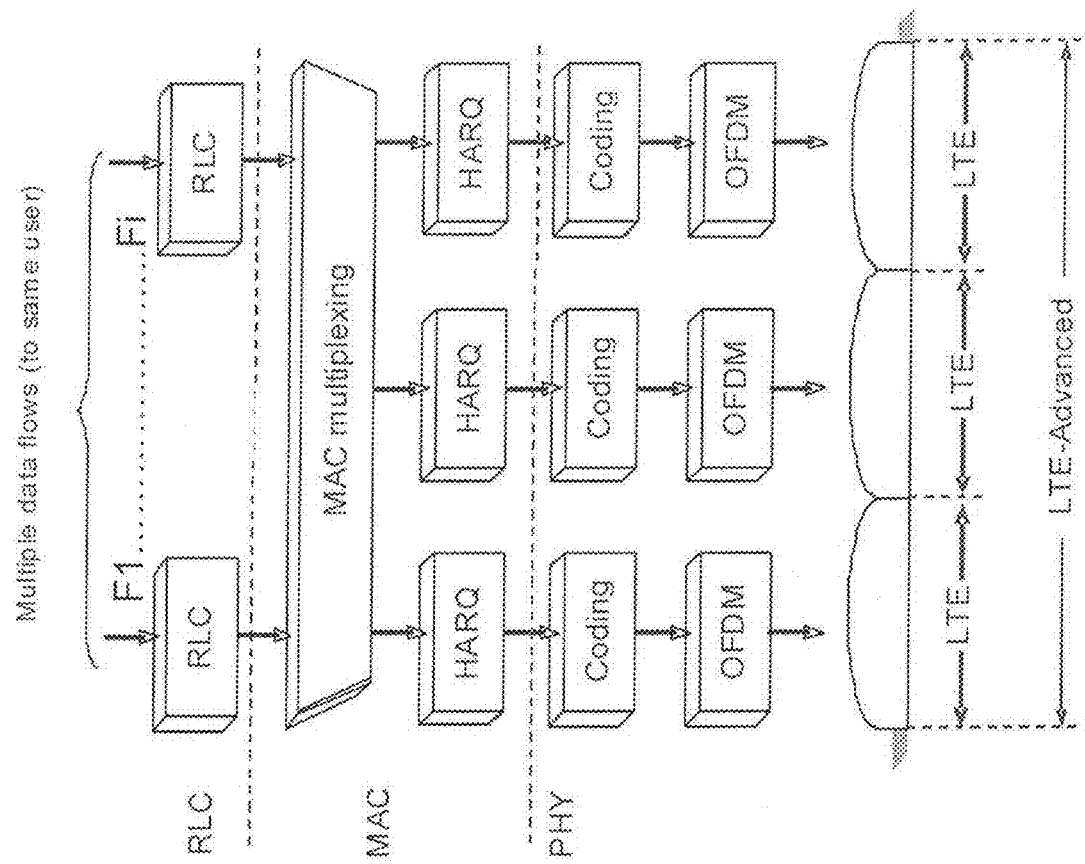
FIG. 9 is a block diagram depicting RLC/MAC and PHY layers for carrier aggregation.
Figure 10:
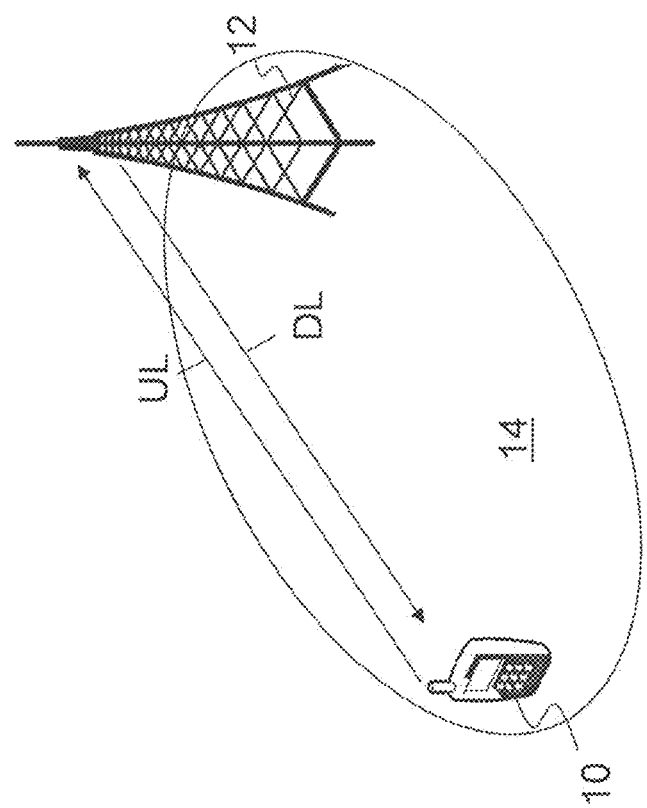
FIG. 10 is a block diagram depicting a radio communications network.

FIG. 10 discloses a schematic radio communication network, also referred to as a wireless communication system, according to a radio access technology such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

The radio communications network comprises a user equipment 10, also referred to as a terminal 10, and a radio base station 12. The radio base station 12 serves the user equipment 10 in a cell 14 by providing radio coverage over a geographical area. The radio base station 12 is transmitting data in a downlink (DL) transmission to the user equipment 10 and the user equipment 10 is transmitting data in an uplink (UL) transmission to the radio base station 12. The UL transmission may efficiently be generated by the use of an Inverse Fast Fourier Transform (IFFT) process at the user equipment 10 and then demodulated at the radio base station 12 by the use of a Fast Fourier Transform (FFT) process.

It should here be noted that the radio base station 12 may also be referred to as e.g. a NodeB, an evolved Node B (eNB, eNode B), a base station, a base transceiver station, Access Point Base Station, base station router, or any other network unit capable of communicating with a user equipment within the cell served by the radio base station 12, depending e.g. on the radio access technology and terminology used. The user equipment 10 may be represented by a terminal e.g. a wireless communication user equipment, a mobile cellular phone, a Personal Digital Assistant (PDA), a wireless platform, a laptop, a computer or any other kind of device capable to communicate wirelessly with the radio base station 12.

The radio base station 12 transmits control information about to which user equipment data is transmitted and upon which resource blocks the data is transmitted. The user equipment 10 tries to decode the control information and data and reports to the radio base station 12 using uplink control signaling whether decoding of data was successful in which case an Acknowledgement (ACK) is transmitted, or not successful, in which case a Non-Acknowledgement (NACK, NAK) is transmitted.

According to embodiments herein the user equipment 10 is arranged to transmit a block of bits corresponding to the uplink control information in slots, i e timeslots, in a subframe over a channel, i e a radio channel, to the radio base station 12. The block of bits may comprise ACK and/or NACK, jointly encoded. The channel may be a Physical Uplink Control Channel (PUCCH), which is a radio channel arranged to carry uplink control information. The block of bits may also be referred to as number of bits, code word, encoded bits, information bits, an ACK/NACK sequence or similar.

The user equipment 10 maps the block of bits to modulation symbols, i e to a sequence of complex valued modulation symbols. This mapping may be a QPSK mapping wherein the resulting QPSK modulation symbol is complex-valued, where one of the two bits in each QPSK modulation symbol represents the real part, also referred to as an I channel, of the modulation symbol and the other bit the imaginary part, also referred to as a Q channel, of the modulation symbol. The modulation symbols may be referred to as complex valued modulation symbols, QPSK symbols, BPSK symbols or similar.

The user equipment 10 then block spreads the sequence of complex valued modulation symbols with a spreading sequence, such as an orthogonal sequence. For example, the same signal or block of bits that has been mapped to the complex valued modulations symbols may be spread across all DFTS-OFDM symbols in a set of DFTS-OFDM symbols by applying the spreading sequence to the sequence of complex valued modulations symbols representing the signal or block of bits. The block spread sequence of complex valued modulation symbols may thereby be divided into parts or segments wherein each segment or part of the block spread sequence of complex valued modulation symbols correspond to or is allocated to one DFTS-OFDM symbol out of the set of DFTS-OFDM symbols, i.e. there is a one to one correspondence between the segments or parts and the DFTS-OFDM symbols. DFTS-OFDM symbols are also referred to as SC-FDMA symbols. SC-FDMA may be seen as normal OFDM with a DFT-based precoding.

According to embodiments herein, the user equipment 10 then transforms or precodes the block-spread sequence of complex valued modulation symbols per DFTS-OFDM symbol with a matrix that depends on a DFTS-OFDM symbol index and/or slot index. Thus, each segment or part of the block spread sequence of complex valued modulation symbols which corresponds to or is allocated to a DFTS-OFDM symbol is transformed separately by applying the matrix to this segment or part of the block spread sequence of complex valued modulation symbols. The matrix may be a general matrix that comprises a DFT matrix, for example, a DFT matrix which is cyclically shifted, wherein the amount of cyclic shift varies with the DFTS-OFDM symbol index and/or slot index. By transforming the block spread sequence of complex valued modulation symbols this way, the inter-cell interference is reduced. A slot comprises several DFTS-OFDM symbols, i.e. each slot is associated with multiple matrices, one for each DFTS-OFDM symbol. The slot index indicates the time slot within which the matrix or matrices is to be applied. The DFTS-OFDM symbol index indicates the DFTS-OFDM symbol, and thereby the segment or part of the block spread sequence of complex valued modulation symbols, to which the matrix is to be applied.

The user equipment 10 then transmits the block spread sequence of complex valued modulation symbols that has been transformed. For example, the user equipment 10 may further OFDM modulate and transmit each transformed or precoded segment or part of the block spread sequence within the time duration of one DFTS-OFDM symbol, i e the DFTS-OFDM symbol that corresponds to the respective segment or part of the block spread sequence of complex valued modulation symbols. The process may be referred to as transformed/precoded OFDM-modulation.

In a variation of this embodiment the sequence of complex valued modulation symbols may be split into multiple parts and each part of the sequence of complex valued modulation symbols may be transmitted in a time slot.

Some embodiments herein may relate to ACK/NACK transmission on PUCCH in a radio communications network employing aggregation of multiple cells, i.e. component carriers, to provide support of bandwidths larger than a single carrier while still providing backwards compatibility with previous technologies. In such a radio communications network a PUCCH format is provided, according to embodiments herein, that is capable of carrying a larger number of bits than provided by existing PUCCH formats, so as to enable ACK/NACK signaling for each of the multiple component carriers.

Embodiments herein enable the high payload PUCCH transmissions required for such signalling by providing a block spread DFTS-OFDM transmission format. According to this format all ACK/NACK information from all component carriers of a single user equipment are jointly encoded in a code word. This code word, corresponding to the block of bits of uplink control information, may in some embodiments then be scrambled to mitigate inter-cell interference and mapped onto symbols such as the sequence of complex valued modulation symbols. Multiplexing of user equipments is enabled with block spreading, i.e. the same signal in form of the code word, possibly scrambled with a different sequence, or in form of the symbols if the codeword has been mapped to symbols prior to the block spreading, is spread or repeated across all DFTS-OFDM symbols of a slot or subframe but the symbols are weighted with a different scalar or weight factor from a spreading sequence for each DFTS-OFDM symbol within the subframe or time slot. The sequence of symbols of each DFTS-OFDM symbol is then transformed or precoded with the matrix, e g a modified precoding matrix, and transmitted within the time duration of one DFTS-OFDM symbol. To mitigate interference even further the matrix of the modified DFTS-OFDM modulator is modified in a pseudo random way, e.g. by permutation of matrix elements. The transformation or precoding may be a modified DFTs-OFDM modulation, where the DFT operation is combined with a cyclic shift operation or a scrambling operation.

Embodiments herein provide a format, referred to as PUCCH format 3, which provides flexibility in that some solutions may be adapted to the required increasing payload of uplink control information. It also introduces means to improve inter-cell interference suppression. These means are either or in combination, scrambling with a scrambling code, selection of the matrix, or cyclic shifting of matrix elements with a cyclic shift pattern. The selection of the scrambling code and/or cyclic shift pattern may depend on cell ID and/or DFTS-OFDM symbol/slot/subframe/radio frame number in a random fashion to randomize inter-cell interference. Furthermore, the format or structure allows trading payload and/or coding gain and/or inter-cell interference suppression against multiplexing capacity. A low code rate means many coded bits relative to information bits and if the coded bits are scrambled, the longer the scrambled sequence the better inter-cell interference suppression. The length of the spreading sequence determines multiplexing capacity.

Figure 11:
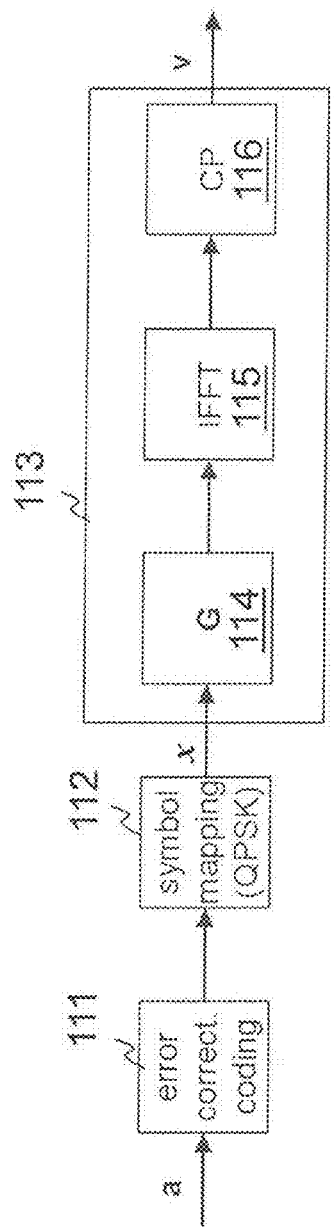
FIG. 11 is a block diagram depicting a process in a user equipment.
Figure 12:
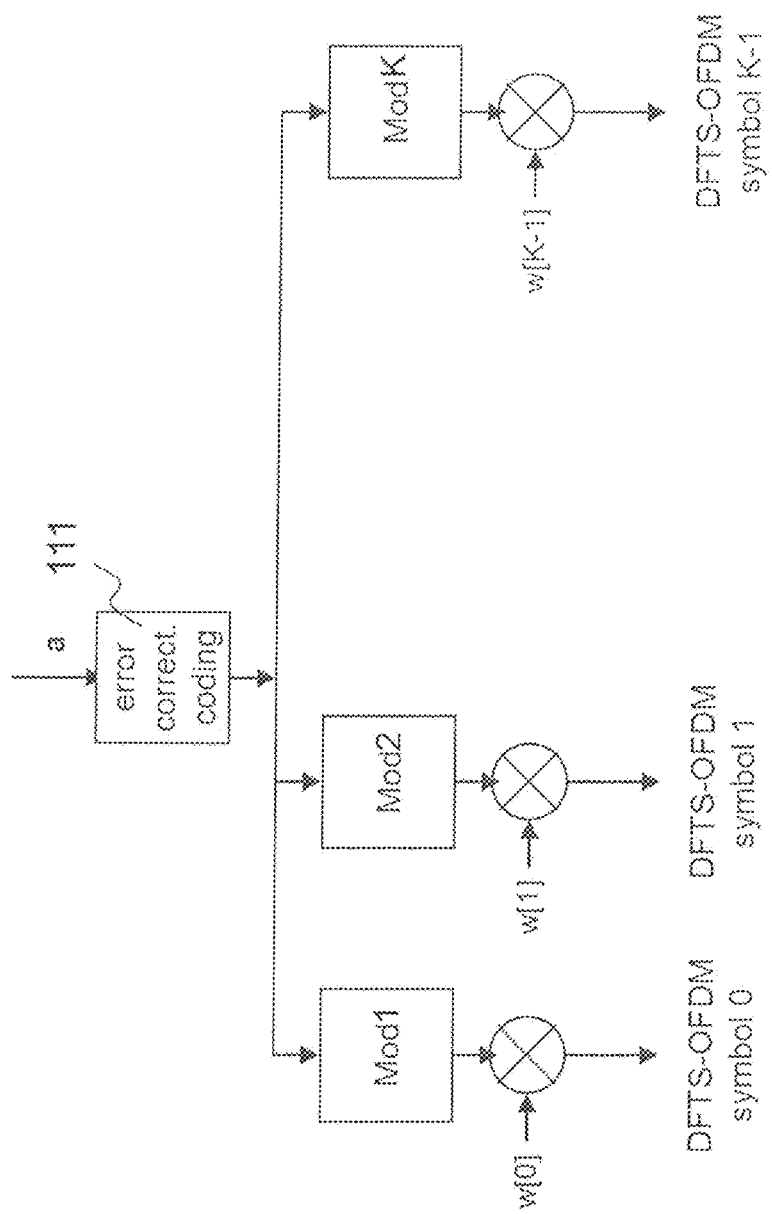
FIG. 12 is a block diagram depicting a process in a user equipment.

FIG. 11 together with FIG. 12 depicts one embodiment of the process in a user equipment 10 for block spreading the sequence of complex valued modulation symbols. FIG. 11 shows how an ACK/NACK sequence a, which is an example of a block of bits corresponding to uplink control information, is transmitted within one DFTS-OFDM symbol. The sequence a represents ACK/NACKs from all aggregated component carriers. Alternatively, the individual bits may also present a logical AND connection of individual ACK/NACK bits. This sequence a may not only represent ACK/NACKs, but Discontinuous transmission (DTX) states may be encoded as well, e.g. if no scheduling assignment has been received for certain component carriers.

In a first step the sequence a may be encoded in an error correction coding module 111 to make it more robust against transmission errors. An error correction coding scheme used may be block codes, convolution codes, etc. The error correction coding module 111 may possibly also comprise an interleaver functionality arranging the block of bits so that errors may occur in a more uniformly distributed manner to increase the performance.

In order to randomize neighbor cell interference, cell specific scrambling with a code c may be applied in a scrambling module resulting in a scrambled sequence, i e scrambled block of bits. The scrambled sequence is then mapped to modulation symbols, using QPSK for example, in a symbol mapping module 112 resulting in a sequence of complex valued modulation symbols x and modulated and transmitted with a DFTS-OFDM modulator 113 resulting in the sequence v of symbols for transmission. The sequence v is a digital signal, so it may be fed into a Digital to Analogue converter, modulated to radio frequency, amplified, fed into antenna and then transmitted.

The DFTS-OFDM modulator 113 is a modified DFTS-OFDM modulator that comprises a matrix G 114 and may also comprise an IFFT module 115 and a cyclic prefix generator 116. Thus, the sequence v is transmitted over a DFTS-OFDM symbol or within a DFTS-OFDM symbol duration. However, to enable multiplexing of different users or user equipments, the block of bits is to be transmitted over several DFTS-OFDM symbols to the radio base station 12. The matrix G 114 comprises matrix elements, and the matrix may correspond to a DFT operation together with a cyclic shift operation of rows or columns of matrix elements, or correspond to a DFT operation together with a scrambling operation of the matrix elements.

For example, the symbol mapping module 112 maps the block of bits onto a sequence of complex valued modulation symbols, x. The block spread sequence of complex valued modulation symbols [w(0)x, w(1)x, w(2)x, . . . , w(K−1)x] is obtained after block-spreading where w=[w(0), w(1), w(2), . . . , w(K−1)] is a spreading sequence of scalars or weight factors, which spreading sequence may in some embodiments comprise an orthogonal sequence. The modified DFTS-OFDM modulation is then done separately for each weighted copy or instance of the modulation symbols w(0)x, w(1)x, w(2)x, . . . , w(K−1)x. The transmission is also done separately, e.g. OFDM(precoded(w(0)x)), OFDM(precoded(w(1)x)), etc. are performed. Thus, pre-coding and transmission may be done so that one weighted copy or instance of the modulation symbols w(k)x is pre-coded and transmitted in each DFTS-OFDM symbol, for k=0, . . . , K−1 where K is the number of DFTS_OFDM symbols over which the modulation symbols are block spread. The spreading sequence, e.g. an orthogonal sequence, provides separation among user equipments, or more specifically, among uplink transmissions made by different user equipments.

It should also be understood that if no frequency hopping is applied, the above-outlined solutions apply to a subframe, with parameters accordingly adapted. The number of available DFTS-OFDM symbols could in this case be 12, assuming 2 DFTS-OFDM symbols reserved for reference signals.

If frequency hopping is enabled, the above-outlined solution may be applied to each slot, possibly with different scrambling codes and spreading sequences. In this case the same payload would be transmitted in both slots. Alternatively, the scrambled sequence or the modulation symbols, i e the sequence of complex valued modulation symbols is divided into two parts and a first part is transmitted in a first slot and a second part in a second slot. In principle even the block of bits a could be split and the first part could be transmitted in the first slot and the second part in the second slot. However, this is less preferable since in this case the block of bits processed and transmitted in each slot is smaller, e g half of the size before the split, resulting in reduced coding gain.

FIG. 12 shows an embodiment wherein the signal or block of bits is block spread. The processing chain comprises the error correction coding module 111. In the simplest case the same signal or block of bits, is block spread i.e. repeated several times, and mapped to modulation symbols, i e a sequence of complex valued modulation symbols, and each copy or instance of the modulation symbols is weighted by a scalar w[k], also referred to as a weight factor from a spreading sequence. It should be noted that the mapping may occur before the block spreading. If we have K DFTS-OFDM symbols the spreading sequence has length K, i.e. w[k] k=0, 1, . . . K−1. K orthogonal spreading sequences may then be constructed and thus K users may be multiplexed. Thus, these K orthogonal sequences are used in the block spreading of the modulation symbols, i e the sequence of complex valued modulation symbols. This is shown in FIG. 12 where each box labeled Mod1-ModK comprises the modules 112-116 according to FIG. 11. Equivalent implementations allow application of the weight factor at other positions anywhere after the symbol mapping module 112 as illustrated in FIG. 12 where a weight factor w[0]-w[K−1] is applied to respective v sequence after the DFTS-OFDM modulator 113 of the respective process chains for DFTS-OFDM symbols 0 . . . K−1. Further, it is equivalent to map first the block of bits to modulation symbols, e g complex valued modulation symbols and then repeat the modulation symbols and to repeat the block of bits and then map each repeated block of bits to modulation symbols.

In an alternative setup the signal or block of bits transmitted in the K DFTS-OFDM symbols is not a copy, if ignoring the scaling of the symbols by w[k], but each block Mod1-ModK in FIG. 12 actually performs scrambling with a different scrambling sequence. Otherwise FIG. 11 is still valid. In this case respective scrambling sequence may depend in addition to the cell ID also on DFTS-OFDM symbol/slot/subframe/radio frame number. Scrambling, and especially that the scrambling sequence may depend on cell ID and/or DFTS-OFDM/slot/subframe/radio frame number, provides better inter-cell interference randomization and mitigation than state-of-the-art DFTS-OFDM PUCCH transmissions.

Assuming, for example, one reference symbol, also denoted reference signal, per slot, K could be six, assuming normal cyclic prefix, in LTE. Alternatively, if no frequency hopping is used K could be 12 assuming one reference signal per slot. The exact design of reference signals is not further discussed.

Depending on the number of allocated resource blocks in the DFTS-OFDM modulator 113 the number of coded bits and thus the code rate and/or payload size, length of ACK/NACK sequence or block of bits a, may be controlled. For example, if only a single resource block is allocated in frequency domain 24 coded bits are available per DFTS-OFDM symbol, assuming QPSK symbols. If this is not sufficient, the number of allocated resource blocks may be increased. More coded bits also allow for a longer scrambling code c resulting in higher scrambling gain.

Figure 13:
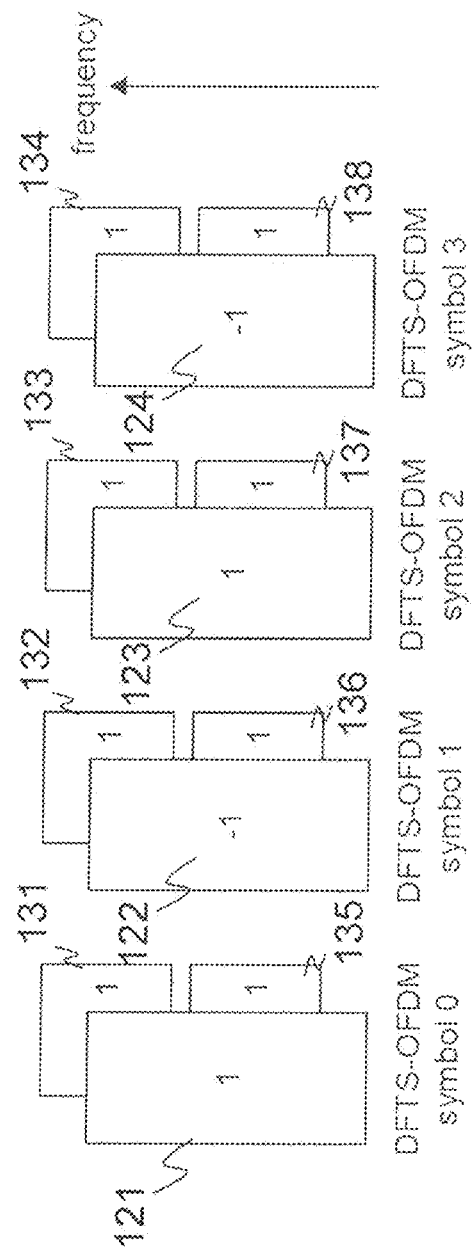
FIG. 13 is a block diagram depicting a process in a user equipment.

It is worthwhile to mention that the proposed scheme allows multiplexing of users with different resource block allocations. In FIG. 13 an example is provided where three user equipments are multiplexed. The first user equipment 10 requires a higher ACK/NACK payload and occupies therefore two resource blocks. For the remaining two user equipments it is sufficient with one resource block each and these are Frequency Division Multiplexing (FDM) multiplexed. Since the user equipments are FDM multiplexed the user equipments may reuse the same spreading sequence, but of course they may also use different spreading sequences. In this example the spreading factor is 4. The user equipment 10 allocating two resource blocks uses the spreading code [1-1 1-1] resulting in block spread sequences of complex valued modulation symbols over DFTS-OFDM symbols denoted as 121-124. The remaining user equipments use spreading code [1 1 1 1] resulting in block spread sequences of complex valued modulation symbols over DFTS-OFDM symbols denoted as 131-134 for a second user equipment and as 135-138 for a third user equipment.

Figure 14:
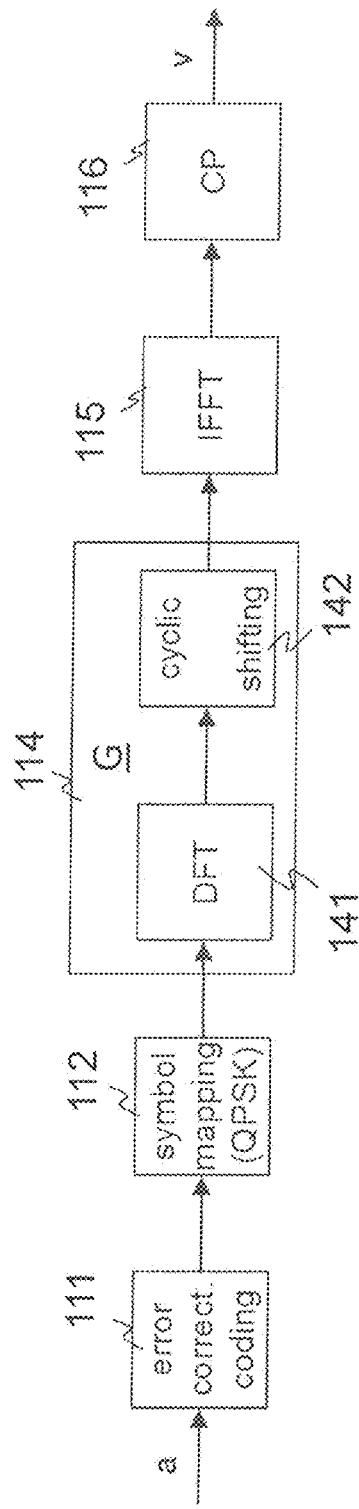
FIG. 14 is a block diagram depicting a process in a user equipment.

FIG. 14 is a block diagram according to an embodiment depicting a processing chain for transmission of uplink control information for one DFTS-OFDM symbol such as a transmitter in the user equipment 10. The user equipment 10 may comprise the error correction coding module 111, wherein the block of bits a may be encoded to make it more robust against transmission errors. In order to randomize neighbor cell interference cell specific scrambling with code c may be applied resulting in a scrambled sequence. The scrambled sequence may then be mapped onto modulation symbols, i e a sequence of complex valued modulation symbols in the symbol mapping module 112, which is then block spread with a spreading sequence (not shown). The user equipment 10 transforms, e.g. precodes, per DFTS-OFDM symbol, the block-spread sequence of complex valued modulation symbols in the DFTS-OFDM modulator 113 with the matrix G 114 that depends on the DFTS-OFDM symbol index and/or slot index. In the illustrated example, the matrix G 114 corresponds to a Discrete Fourier Transformation (DFT) operation 141 together with a cyclic shift operation 142 of rows or columns. The user equipment 10 may also comprise the IFFT module 115 and the cyclic prefix generator 116. Thus, the block spread sequence of complex valued modulation symbols is modulated and transmitted over the DFTS-OFDM symbol or within one DFTS-OFDM symbol duration. However, to enable multiplexing of different users, the error correction encoded block of bits is to be transmitted over several DFTS-OFDM symbols to the radio base station 12.

Figure 15:
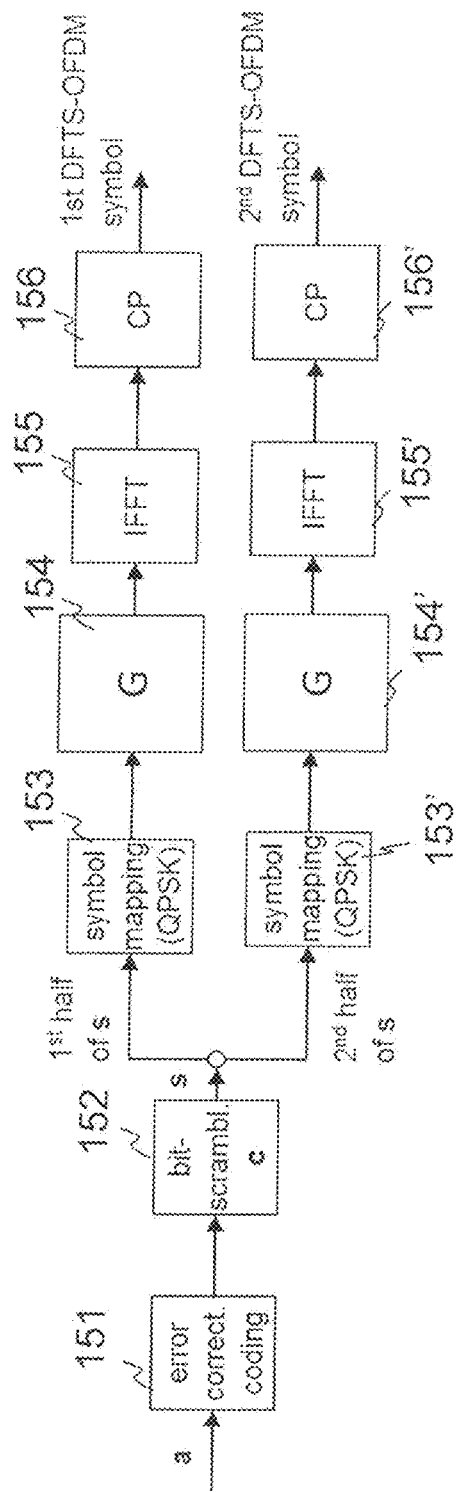
FIG. 15 is a block diagram depicting a process in a user equipment.

A variation of the above embodiment is where the scrambled sequence is not mapped onto one DFTS-OFDM symbol but onto several DFTS-OFDM symbols. FIG. 15 shows an example where a scrambled block of bits s is transmitted over two DFTS-OFDM symbols, or over the time duration of two DFTS-OFDM symbols. In this example a 48 bit long scrambled sequence or block of bits s is mapped to 24=2×12 QPSK symbols and transmitted in two DFTS-OFDM symbols, assuming one resource block allocation and each DFTS-OFDM symbol carrying 12 symbols. The block of bits a may be processed in an error correction coding module 151, which may correspond to the error correction coding module 111 in FIG. 11. In order to randomize neighbor cell interference, cell specific scrambling with a code c in a bit scrambling module 152 may be applied resulting in a scrambled sequence s, i e a scrambled block of bits. The scrambled sequence s is spread over or divided on two different DFTS-OFDM symbols. The first half of s is then mapped to symbols, using QPSK, for example, in a first symbol mapping module 153 and modulated and transmitted with a first modified DFTS-OFDM modulator. The first modified DFTS-OFDM modulator comprises a first precoding matrix G 154 and may also comprise a first IFFT module 155 and a first cyclic prefix generator 156.

The second half of s is then mapped to symbols, e g to complex valued modulation symbols, using QPSK, for example, in a second symbol mapping module 153' and modulated and transmitted with a second modified DFTS-OFDM modulator. The second modified DFTS-OFDM modulator comprises a second precoding matrix G 154' and may also comprise a second IFFT module 155' and a second cyclic prefix generator 156'.

Thus, the first half the block of bits is transmitted over the first DFTS-OFDM symbol and the second half the block of bits is transmitted over the second DFTS-OFDM symbol. However, to enable multiplexing of different users, the error correction encoded scrambled block of bits s is to be transmitted over several DFTS-OFDM symbols to the radio base station 12.

Figure 16:
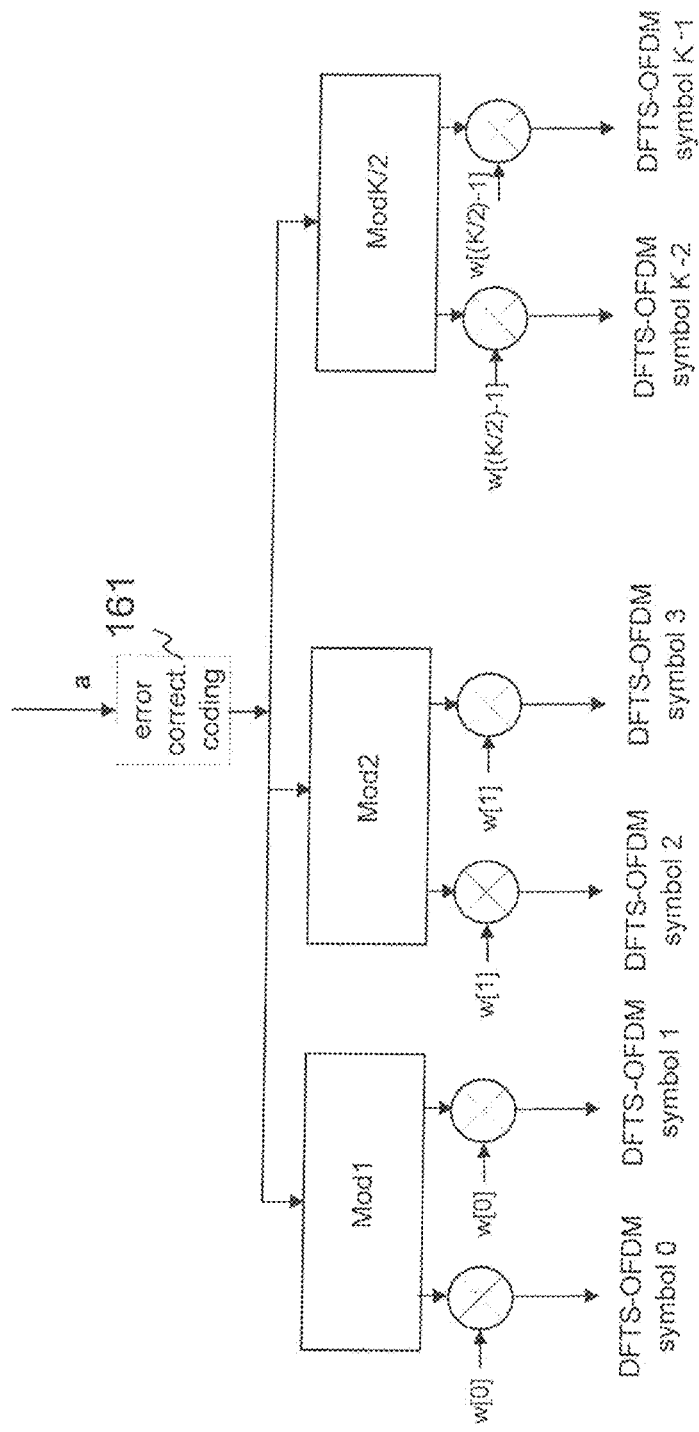
FIG. 16 is a block diagram depicting a process in a user equipment.

An embodiment of an accordingly modified block spreading process is depicted in FIG. 16. In this example block spreading in case that the scrambled block of bits s is transmitted over two DFTS-OFDM symbols is shown. Each block "Mod" comprises the arrangement shown in FIG. 15, excluding error correction coding functionality. This variation enables higher payloads and scrambling gain compared to the base line case of FIG. 11. However, the price to be paid is reduced multiplexing capacity. If we assume K DFTS-OFDM symbols are available for transmission, and use L of them for one instance of the scrambled block of bits, the length of the spreading code or spreading sequence—and thus the multiplexing capacity—reduces to K/L. In this example the multiplexing capacity is reduced by a factor of 2 compared to the case when the scrambled block of bits s is modulated and transmitted over one DFTS-OFDM symbol. The block of bits corresponding to uplink information, such as ACK/NACKs, is processed in an error correction coding module 161, which may correspond to the error correction coding module 111 in FIG. 11. A number of modules Mod1-ModK/2 in FIG. 16 performs scrambling with a different scrambling sequence, where a weight factor w[0]-w[(K/2)−1] is applied to the respective block spread modulation symbols, i e the respective block spread sequence of complex valued modulation symbols after the modules Mod1-ModK/2.

Figure 17:
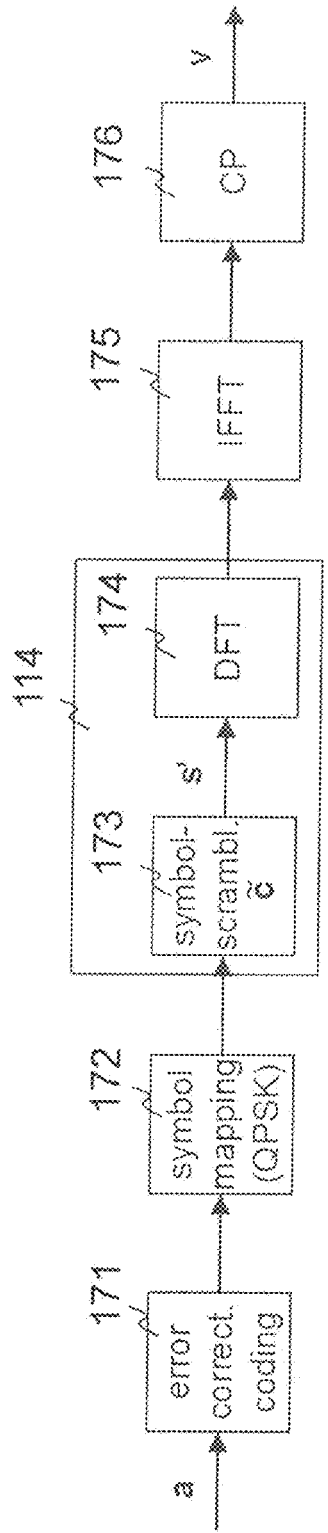
FIG. 17 is a block diagram depicting a process in a user equipment.

In another embodiment, in which the order of the scrambling operation and the symbol mapping is performed are changed according to FIG. 17. Here the scrambling is applied on symbol level rather than on bit level, which means that the symbol mapping is performed before the symbol scrambling. The scrambling code $\tilde{c}$ may depend on the cell ID as well as on DFTS-OFDM symbol index/slot/subframe/radio frame number. The user equipment 10 may herein comprise an error correction coding module 171, wherein the sequence or block of bits a may be encoded to make it more robust against transmission errors. The error correction coding module 171 may correspond to the error correction coding module 111 in FIG. 11. The block of bits is then mapped onto modulation symbols, i e a sequence of complex valued modulation symbols in a symbol mapping module 172. In order to randomize neighbor cell interference, cell specific scrambling with code $\tilde{c}$ may be applied to the symbols in a symbol scrambling module 173, resulting in a scrambled sequence s'. The scrambled sequence is then discrete Fourier transformed in a DFT module 174. The symbol scrambling module 173 and DFT module 174 may be comprised in the matrix G 114. Thus, the user equipment 10 then transforms e.g. precodes, per DFTS-OFDM symbol, the block-spread modulation symbols, i e the block spread sequence of complex valued modulation symbols, with the matrix G 114 that depends on a DFTS-OFDM symbol index and/or slot index. The user equipment 10 may also comprise an IFFT module 175 and a cyclic prefix generator 176. Thus, the block spread modulation symbols, i e the block spread sequence of complex valued modulation symbols, is transmitted over the DFTS-OFDM symbol or within one DFTS-OFDM symbol duration. However, to enable multiplexing of different users, the block of bits is to be transmitted over several DFTS-OFDM symbols to the radio base station 12.

The scrambling operation may in some embodiments mathematically be described by multiplication with a diagonal matrix C which diagonal elements are constituted by the elements of the scrambling code $\tilde{c}$, wherein $\tilde{c}$ is the scrambling sequence on symbol level. The subsequent DFT operation may be described by DFT matrix F. Using this notation the combined operation may for these illustrated examples be expressed by the matrix G=FC. The scrambling and DFT operation may be performed in the matrix G. In this case the block spreading is performed prior to the scrambling operation.

Figure 18:
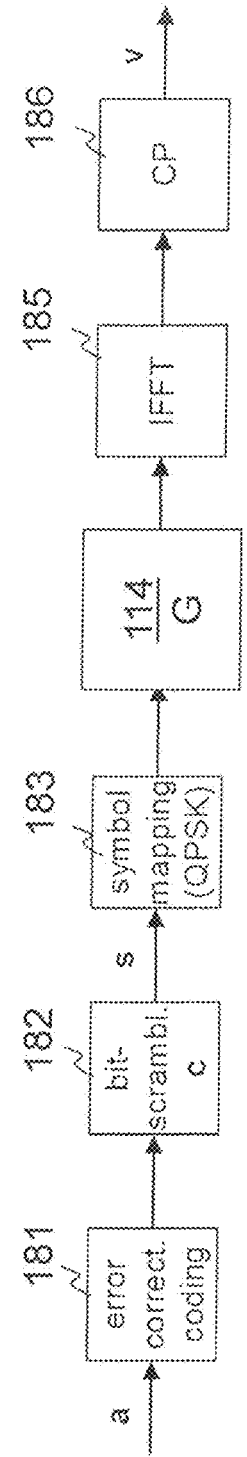
FIG. 18 is a block diagram depicting a process in a user equipment.

In FIG. 18 a block diagram of embodiments herein is disclosed. The user equipment 10 may alternatively comprise an error correction coding module 181, wherein the sequence or block of bits a may be encoded to make it more robust against transmission errors. The error correction coding module 181 may correspond to the error correction coding module 111 in FIG. 11. In order to randomize neighbor cell interference cell specific scrambling with code c may be applied to the possibly error correction encoded block of bits in a bit scrambling module 182. The scrambled block of bits s is then mapped onto a sequence of complex valued modulation symbols in a symbol mapping module 183. The modulation symbols are block spread with a spreading sequence (not shown). The user equipment 10 then transforms e.g. precodes, per DFTS-OFDM symbol, the block-spread sequence of complex valued modulation symbols, with the matrix G 114 that depends on a DFTS-OFDM symbol index and/or slot index. The user equipment 10 may also comprise a IFFT module 185 and a cyclic prefix generator 186. The block spread modulation symbols, i e the block spread sequence of complex valued modulation symbols, is modulated and transmitted over the DFTS-OFDM symbol or within one DFTS-OFDM symbol duration. However, to enable multiplexing of users the scrambled block of bits s is to be transmitted over several DFTS-OFDM symbols to the radio base station 12.

The matrix G 114 in the DFTS-OFDM modulator 113 may vary with cell ID and/or DFTS-OFDM symbol index/slot/subframe/radio frame number because of the scrambling code dependence.

The matrix G may be a product of a diagonal matrix and a DFT matrix. However, instead of a product, we may assume a general matrix G. To randomize interference matrix G may depend on cell ID and/or DFTS-OFDM symbol index/slot/subframe/radio frame number. In order to be able to decode the transmitted signal of uplink control information at the receiver the minimum requirement on G is that its inverse exists.

A simpler receiver may be constructed if matrix G is orthogonal since in this case its inverse is just the hermitian transpose of matrix G. Depending on the application a low envelope fluctuation of the transmitted signal of uplink control information, low cubic metric or peak to average power ratio, may be of interest. In this case the combination of matrix G and subsequent IFFT operation should result in a signal with low cubic metric.

One such matrix would be a DFT matrix, which rows or columns are cyclically shifted, e.g. assuming M rows, row 1 becomes row n, row 2 becomes row (n+1) mod M, and so on. This operation results in a cyclic shift of the subcarriers or mapped complex valued modulation symbols, see FIG. 14 for an illustration. The amount of cyclic shifting or cyclic shift pattern may depend on cell ID and/or DFTS-OFDM symbol index/slot/subframe/radio frame number. Cyclic shifting of subcarriers or complex valued modulation symbols that depends on cell ID as well as, or, DFTS-OFDM symbol index/slot/subframe/radio frame number randomizes inter-cell interference and mitigates inter-cell interference. This improves inter-cell interference mitigation compared to prior art DFTS-OFDM PUCCH transmissions. The DFT matrix may in some embodiments be the product of a DFT matrix and a diagonal scrambling matrix.

A general permutation of rows or columns is also possible; however, cubic metric increases in this case.

The techniques disclosed herein enable, e.g. high payload PUCCH transmissions, in some embodiments. Furthermore, these techniques may also provide flexibility to adapt the solution to the required payload. These techniques are also helpful in that they introduce means to improve inter-cell interference. These means are either scrambling with a scrambling code, selection of a matrix G, and/or cyclic shifting of matrix elements with a cyclic shift pattern. The selection of the scrambling code c or cyclic shift pattern may depend on cell ID and/or DFTS-OFDM symbol/slot/subframe/radio frame number in a pseudo random fashion to randomize inter-cell interference. Furthermore, embodiments herein allow varying the structure of PUCCH format to trade payload and/or coding gain and/or inter-cell interference suppression against multiplexing capacity.

Figure 19:
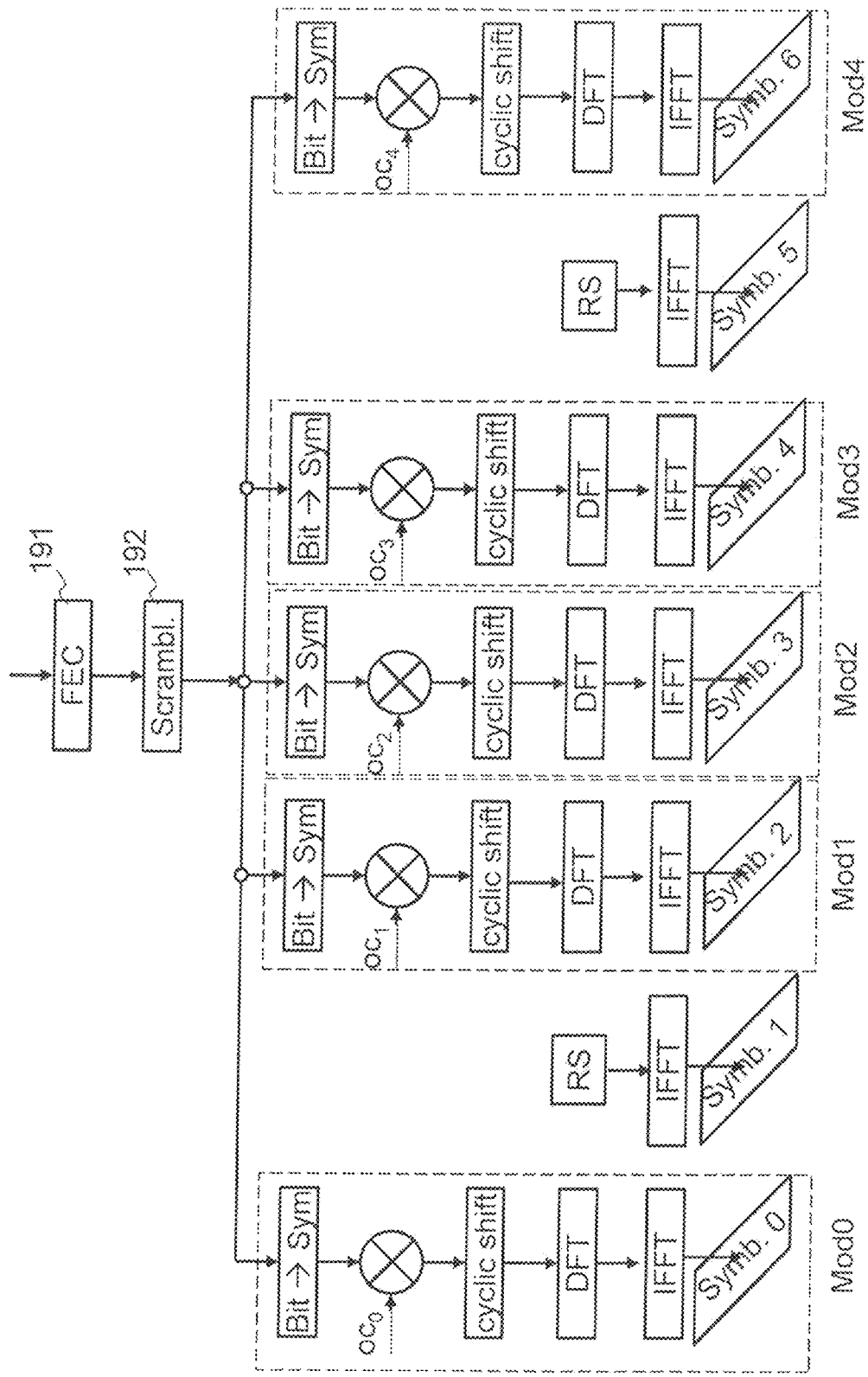
FIG. 19 is a block diagram depicting a process in a user equipment.

FIG. 19 is a schematic block diagram depicting an embodiment of a transmission process in the user equipment 10. A block of bits corresponding to uplink control information is to be transmitted over a radio channel to the radio base station 12. For example, a number of HARQ feedback bits may be determined by the number of configured cells and transmission mode, e.g. Component Carrier 1 (CC1), CC3: MIMO, CC2: no MIMO. The block of bits may be error correction encoded in a Forward Error Correction (FEC) module 191. Furthermore, the error correction encoded block of bits may then be scrambled in a bit scrambling module 192, which may correspond to the bit scrambling module 182 in FIG. 18. The user equipment 10 further comprises a number of block modules Mod0-Mod4. Each block module comprises a bit to symbol mapping module wherein the block of bits is mapped to a sequence of complex valued modulation symbols. Furthermore, each block module Mod0-Mod4 comprises a block spreading module configured to together block spread the sequence of complex valued modulation symbols with a spreading sequence oc1-oc4, e.g. orthogonal cover to multiplex user equipments. Within each block module the block spreading is just a multiplication by oci, i=0, . . . , 4. The block modules Mod0-Mod4 together block spread the sequence of complex valued modulation symbols with [oc0, oc1, oc4]. Also, the block spread sequence of complex valued modulation symbols is transformed per DFTS-OFDM symbol, i.e. each segment of the block spread sequence of complex valued modulation symbols is transformed by applying a matrix that depends on, i.e. varies with, a DFTS-OFDM symbol index and/or slot index. This may be performed by first cyclically shifting each segment of the block spread sequence of complex valued modulation symbols, thus performing a pseudo-random cyclic shift to randomize inter-cell interference. Then each cyclically shifted segment is processed, e.g. transformed, in a DFT matrix. The cyclically shifted and DFT transformed segment is then IFFT transformed and the block spread sequence of complex valued modulation symbols that has been transformed is transmitted over the DFTS-OFDM symbols or within the duration of the DFTS-OFDM symbols.

Reference signals (RS)s are also transmitted according to a pattern over a DFTS-OFDM symbol duration. Each RS is IFFT transformed before being transmitted.

Various embodiments herein include methods of encoding and/or transmitting signalling messages according to the techniques described above, in LTE-Advanced or other wireless communication systems. Other embodiments include user equipments or other wireless nodes configured to carry out one or more of these methods, including mobile stations configured to encode and/or transmit signalling messages according to these techniques, and wireless base stations, e.g., e-NodeB's, configured to receive and/or decode signals transmitted according to these signalling methods. Several of these embodiments may comprise one or more processing circuits executing stored program instructions for carrying out the signalling techniques and signalling flows described herein; those skilled in the art will appreciate that these processing circuits may comprise one or more microprocessors, microcontrollers, or the like, executing program instructions stored in one or memory devices.

Of course, those skilled in the art will appreciate that the inventive techniques discussed above are not limited to LTE systems or to apparatuses having a physical configuration identical to that suggested above, but will appreciate that these techniques may be applied to other telecommunication systems and/or to other apparatuses.

Figure 20:
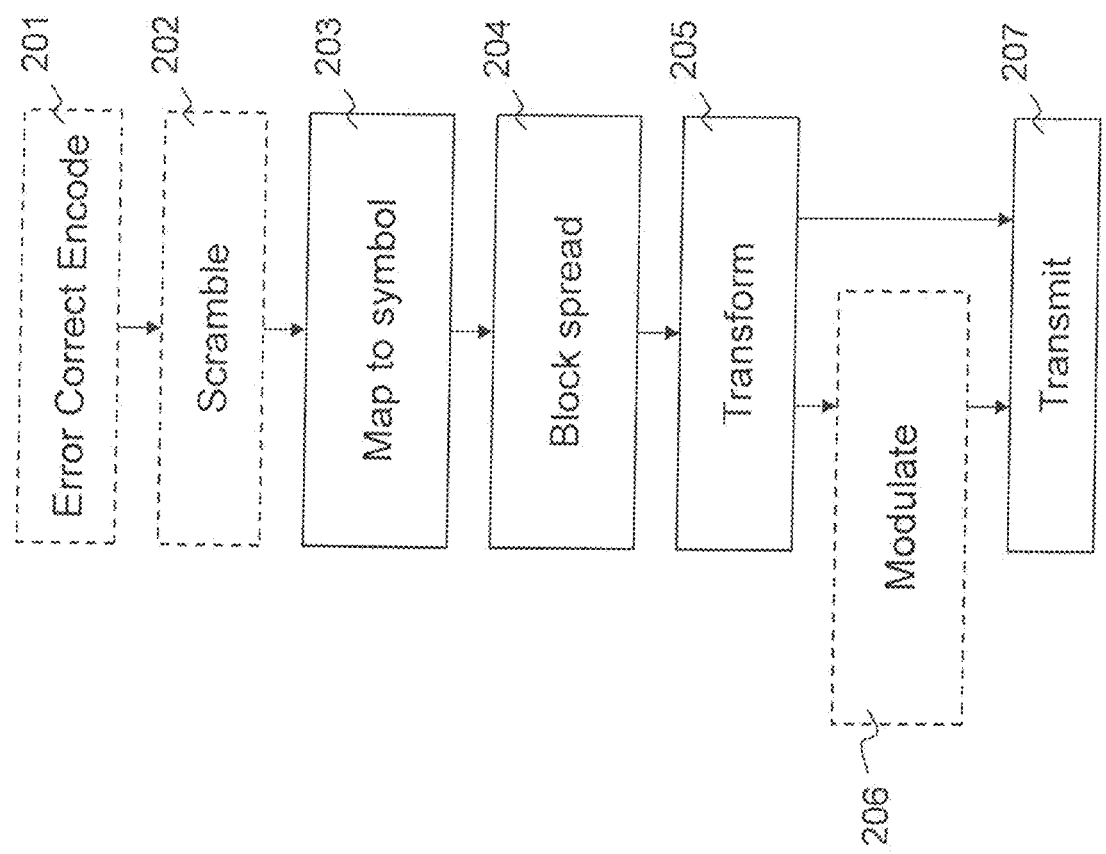
FIG. 20 is a schematic flowchart of a process in a user equipment.

The method steps in the user equipment 10 for transmitting uplink control information in time slots in a subframe over a radio channel to the radio base station 12 according to some general embodiments will now be described with reference to a flowchart depicted in FIG. 20. The steps do not have to be taken in the order stated below, but may be taken in any suitable order. The radio channel is arranged to carry uplink control information and the user equipment 10 and radio base station 12 are comprised in a radio communications network. The uplink control information is comprised in a block of bits. In some embodiments the block of bits corresponds to uplink control information and comprises jointly encoded acknowledgements and non-acknowledgements. The radio channel may be a PUCCH.

Step 201. The user equipment 10 may in some embodiments, as indicated by the dashed line, error correction encode the block of bits. For example, the block of bits may be forward error correction processed or similar.

Step 202. The user equipment 10 may in some embodiments, as indicated by the dashed line, scramble the block of bits before mapping the block of bits to the sequence of complex valued modulation symbols. The scrambling process is to reduce inter cell interference and may be cell specific or similar.

Step 203. The user equipment 10 maps the block of bits to a sequence of complex valued modulation symbols.

Step 204. The user equipment 10 block spreads the sequence of complex valued modulation symbols across DFTS-OFDM symbols by applying a spreading sequence to the sequence of complex valued modulation symbols, to achieve a block spread sequence of complex valued modulation symbols.

Step 205. The user equipment 10 transforms, per DFTS-OFDM symbol, the block-spread sequence of complex valued modulation symbols by applying a matrix that depends on a DFTS-OFDM symbol index and/or slot index to the block-spread sequence of complex valued modulation symbols. In some embodiments, the matrix comprises matrix elements, and the matrix corresponds to a DFT operation together with a cyclic shift operation of rows or columns of the matrix elements. In some alternative embodiments, the matrix, that comprises matrix elements, corresponds to a Discrete Fourier Transformation operation together with a scrambling operation of the matrix elements.

Step 206. The user equipment 10 may in some embodiments, as indicated by the dashed line, further OFDM modulate, per DFTS-OFDM symbol, the block spread sequence of complex valued modulation symbols that has been transformed. For example, the sequence may be transformed in an IFFT process and a cyclic prefix may be added in a cyclic prefix process.

Step 207. The user equipment 10 transmits the block spread sequence of complex valued modulation symbols that has been transformed over the radio channel to the radio base station 12. In some embodiment the transmitting comprises to transmit a first part of the sequence of complex valued modulation symbols in a first time slot and a second part of the sequence of complex valued modulation symbols in a second time slot.

Depending on whether frequency-hopping at slot boundaries is applied, other variants may be derived.

In some embodiments a method in a terminal for transmitting uplink control information in a slot in a subframe over a channel to a base station in a wireless communication system is provided. The uplink control information may be comprised in a code word. The terminal maps the code word to modulation symbols. The terminal then block spreads the modulation symbols across DFTS-OFDM symbols by repeating the modulation symbols for each DFTS-OFDM symbol and applying a block spreading sequence of weight factors to the repeated modulation symbols, wherein the repeated modulation symbols include the modulation symbols to which the code word has been mapped, to achieve a respective weighted copy of the modulation symbols for each DFTS-OFDM symbol. The terminal then transforms, in some embodiments by precoding or DFTS-OFDM modulating, for each DFTS-OFDM symbol, the respective weighted copy of the modulation symbols by applying a matrix that depends on a DFTS-OFDM symbol index and/or slot index to the respective weighted copy of the modulation symbols. The terminal 10 then transmits, on, or in/within, each DFTS-OFDM symbol or symbol duration, the respective weighted copy of the modulation symbols that has been transformed to the base station. In alternative embodiments, the code word may be repeated for each DFTS-OFDM symbol and then the repeated code words, including the code word that has been repeated, are mapped to modulation symbols, i e in these embodiments the repeating and mapping steps of the block spreading are done in reverse order, and followed by the weighting step.

The channel may be a Physical Uplink Control Channel and the code word may be a number of bits. The modulation symbols may be QPSK symbols or BPSK symbols. In some embodiments, the block spreading sequence may be an orthogonal sequence. The step of transforming may in some embodiments comprise to cyclically shift the matrix, which matrix may be a Discrete Fourier Transform matrix.

Figure 21:
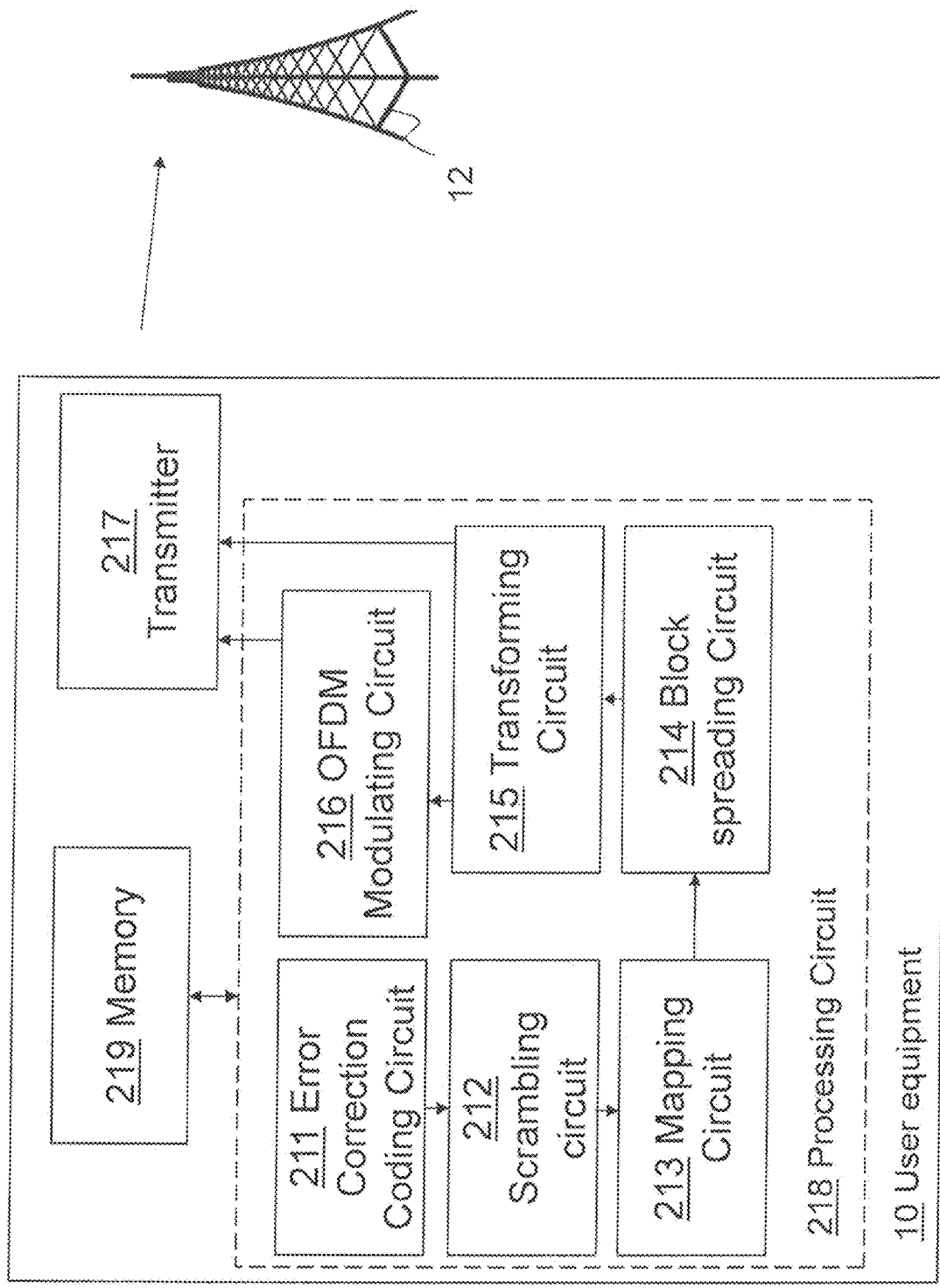
FIG. 21 is a block diagram depicting a user equipment.

To perform the method steps above for transmitting uplink control information in time slots in the subframe over the radio channel to the radio base station 12 the user equipment 10 comprises an arrangements depicted in FIG. 21. The radio channel may comprise PUCCH or other uplink control radio channels and is arranged to carry uplink control information. As stated above, the block of bits may correspond to uplink control information and comprise jointly encoded acknowledgements and non-acknowledgements.

In some embodiments the user equipment 10 may comprise an error correction coding circuit 211 configured to error correction encode the block of bits.

Furthermore, the user equipment may comprise a scrambling circuit 212 configured to scramble the block of bits before mapping the block of bits to the sequence of complex valued modulation symbols.

The user equipment 10 comprises a mapping circuit 213 configured to map the block of bits to the sequence of complex valued modulation symbols.

Furthermore, the user equipment 10 comprises a block spreading circuit 214 configured to block spread the sequence of complex valued modulation symbols across DFTS-OFDM symbols by applying a spreading sequence to the sequence of complex valued modulation symbols, thereby achieving a block spread sequence of complex valued modulation symbols.

The user equipment 10 also comprises a transforming circuit 215 configured to transform, per DFTS-OFDM symbol, the block-spread sequence of complex valued modulation symbols by applying a matrix that depends on a DFTS-OFDM symbol index and/or slot index to the block-spread sequence of complex valued modulation symbols.

The matrix may in some embodiments comprise matrix elements and correspond to a Discrete Fourier Transformation operation together with a cyclic shift operation of rows or columns of the matrix elements. The matrix, that may comprise matrix elements, may correspond to a Discrete Fourier Transformation operation together with a scrambling operation of the matrix elements.

Additionally, the user equipment 10 comprises a transmitter 217 configured to transmit the block spread sequence of complex valued modulation symbols that has been transformed over the radio channel to the radio base station 12. The transmitter 217 may in some embodiments be configured to transmit a first part of the sequence of complex valued modulation symbols in a first time slot and a second part of the sequence of complex valued modulation symbols in a second time slot.

In some embodiments the user equipment 10 further comprises an OFDM modulator 216, which is modified or configured to OFDM modulate, per DFTS-OFDM symbol, the block spread sequence of complex valued modulation symbols that has been transformed. For example, each segment of the block spread sequence of complex valued modulation symbols within a DFTS-OFDM symbol is transformed by applying the matrix to the segment of the block spread sequence of complex valued modulation symbols in the transforming circuit 215, and then OFDM modulated in the OFDM modulator 216 and transmitted within the DFTS-OFDM symbol. The transmitter 217 may be comprised in the OFDM modulator 216.

The embodiments herein for transmitting uplink control information over a radio channel to the radio base station 12 may be implemented through one or more processors, such as a processing circuit 218 in the user equipment 10 depicted in FIG. 21, together with computer program code for performing the functions and/or method steps of the embodiments herein. The program code mentioned above may also be provided as a computer program product, for instance in the form of a data carrier carrying computer program code for performing the present solution when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The user equipment 10 may further comprise a memory 219 configured to be used to store data, spreading sequence, matrix, and application to perform the method when being executed on the user equipment 10 and/or similar.

Figure 22:
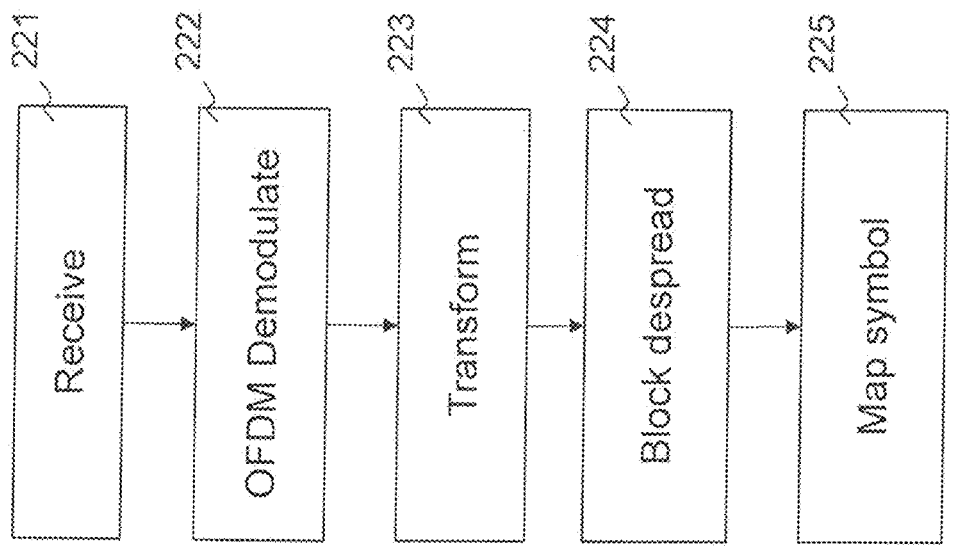
FIG. 22 is a schematic flowchart of a process in a radio base station.

The method steps in the radio base station 12 for receiving uplink control information in time slots in a subframe over a radio channel from the user equipment 10 according to some general embodiments will now be described with reference to a flowchart depicted in FIG. 22. The steps do not have to be taken in the order stated below, but may be taken in any suitable order. The radio channel is arranged to carry uplink control information and the user equipment 10 and radio base station 12 are comprised in a radio communications network. The uplink control information is comprised in a block of bits. In some embodiments the block of bits corresponds to uplink control information and comprises jointly encoded acknowledgements and not acknowledgements. The radio channel may be a PUCCH.

Step 221. The radio base station 12 receives a sequence of complex valued modulation symbols.

Step 222. The radio base station 12 OFDM demodulates the sequence of complex valued modulation symbols.

Step 223. The radio base station 12 then transforms, per DFTS-OFDM symbol, the OFDM demodulated sequence of complex valued modulation symbols by applying a matrix that depends on a DFTS-OFDM symbol index and/or slot index to the OFDM demodulated sequence of complex valued modulation symbols. This matrix may perform/result in the inverse operation to that of the matrix G in the user equipment 10. The inverse operation may in some embodiments comprise an Inverse Discrete Fourier Transform operation, and the inverse matrix to the matrix G may comprise an Inverse Discrete Fourier Transform matrix.

Step 224. The radio base station 12 also block despreads the sequence of complex valued modulation symbols that has been OFDM demodulated and transformed, with a despreading sequence, such as an orthogonal sequence.

Step 225. The radio base station 12 maps the despread sequence of complex valued modulation symbols that has been OFDM demodulated and transformed, to a block of bits representing the uplink control information.

Thus, the radio base station 12 may decode the received uplink control information.

Figure 23:
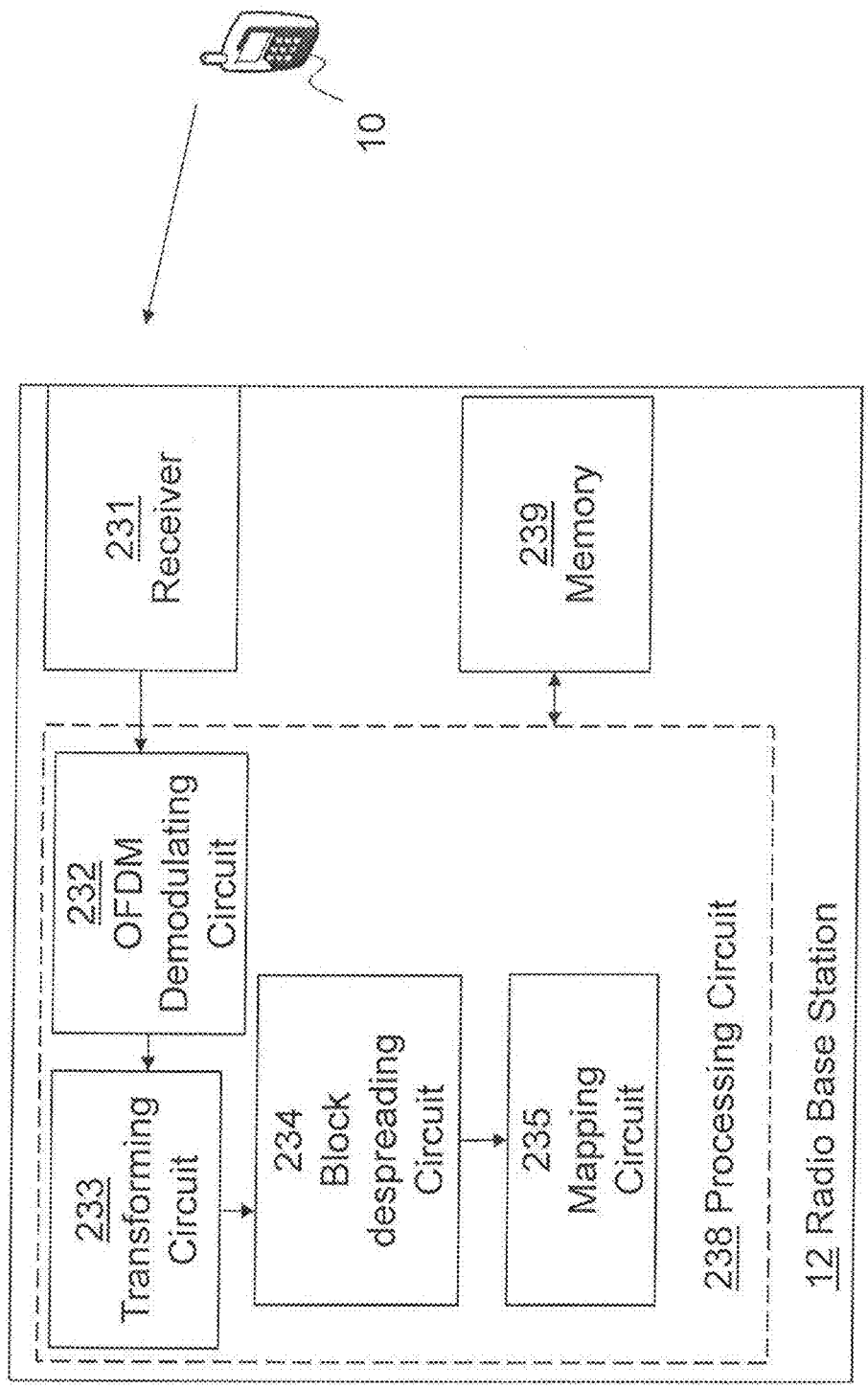
FIG. 23 is a block diagram depicting a radio base station.

The method may be performed by a radio base station 12. FIG. 23 is a block diagram of the radio base station 12 for receiving uplink control information in time slots in a subframe over a radio channel from the user equipment 10. The radio channel is arranged to carry uplink control information.

The radio base station 12 comprises a receiver 231 configured to receive a sequence of complex valued modulation symbols and an OFDM demodulating circuit 232 configured to OFDM demodulate the sequence of complex valued modulation symbols.

Furthermore, the radio base station 12 comprises a transforming circuit 233 configured to transform, per DFTS-OFDM symbol, the OFDM demodulated sequence of complex valued modulation symbols by applying a matrix that depends on a DFTS-OFDM symbol index and/or slot index to the OFDM demodulated sequence of complex valued modulation symbols. This matrix may perform/result in the inverse operation to that of the matrix G in the user equipment 10. The inverse operation may in some embodiments comprise an Inverse Discrete Fourier Transform operation, and the inverse matrix to the matrix G may comprise an Inverse Discrete Fourier Transform matrix.

The radio base station 12 also comprises a block despreading circuit 234 configured to block despread the sequence of complex valued modulation symbols that has been OFDM demodulated and transformed, with a despreading sequence.

Furthermore, the radio base station 12 comprises a mapping circuit 235 configured to map the despread sequence of complex valued modulation symbols that has been OFDM demodulated and transformed, to a block of bits representing the uplink control information.

The embodiments herein for receiving uplink control information over a radio channel from the user equipment 10 may be implemented through one or more processors, such as a processing circuit 238 in the radio base station 12 depicted in FIG. 23, together with computer program code for performing the functions and/or method steps of the embodiments herein. The program code mentioned above may also be provided as a computer program product, for instance in the form of a data carrier carrying computer program code for performing the present solution when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

The radio base station 12 may further comprise a memory 239 comprising one or more memory units and configured to be used to store data, spreading sequence, matrix, and application to perform the method when being executed on the radio base station 12 and/or similar.

In the drawings and specification, there have been disclosed exemplary embodiments herein. However, many variations and modifications may be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a user equipment for transmitting uplink control information in time slots of a subframe over a radio channel to a radio base station, wherein the radio channel is configured to carry uplink control information, wherein the uplink control information is comprised in a block of bits, and wherein the user equipment and radio base station are comprised in a radio communications network, the method comprising:
   mapping the block of bits to a sequence of complex-valued modulation symbols;
   block spreading the sequence of complex-valued modulation symbols across Discrete Fourier Transform Spread-Orthogonal Frequency Division Multiplexing (DFTS-OFDM) symbols by applying a spreading sequence to the sequence of complex-valued modulation symbols to achieve a block-spread sequence of complex-valued modulation symbols;
   transforming, per DFTS-OFDM symbol, the block-spread sequence of complex-valued modulation symbols by applying, for each DFTS-OFDM symbol, to a part of the block-spread sequence of complex-valued modulation symbols corresponding to that DFTS-OFDM symbol, a matrix comprising matrix elements, wherein the matrix elements are cyclically shifted depending on at least one of a DFTS-OFDM symbol index and a slot index; and
   transmitting the block-spread sequence of complex-valued modulation symbols, as transformed, over the radio channel to the radio base station.

2. The method according to claim 1, wherein applying the matrix corresponds to performing a Discrete Fourier Transformation operation together with a cyclic shift operation.

3. The method according to claim 1, further comprising:
   error correction encoding the block of bits; and
   scrambling the block of bits before mapping the block of bits to the sequence of complex-valued modulation symbols.

4. The method according to claim 1, further comprising OFDM modulating, per DFTS-OFDM symbol, the block-spread sequence of complex-valued modulation symbols, as transformed.

5. The method according to claim 1, wherein transmitting the block-spread sequence of complex-valued modulation symbols, as transformed, over the radio channel to the radio base station comprises transmitting a first part of the sequence of complex-valued modulation symbols in a first time slot and a second part of the sequence of complex-valued modulation symbols in a second time slot.

6. The method according to claim 1, wherein the block of bits corresponds to uplink control information and comprises jointly encoded acknowledgements and non-acknowledgements.

7. The method according to claim 1, wherein cyclically shifting of the matrix elements depends on cell ID.

8. A method in a radio base station for receiving uplink control information in time slots of a subframe over a radio channel from a user equipment, wherein the radio channel is configured to carry uplink control information, wherein the uplink control information is comprised in a block of bits, and wherein the user equipment and radio base station are comprised in a radio communications network, the method comprising:
receiving a sequence of complex-valued modulation symbols;
Orthogonal Frequency Division Multiplexing (OFDM) demodulating the sequence of complex-valued modulation symbols;
transforming, per Discrete Fourier Transform Spread-Orthogonal Frequency Division Multiplexing (DFTS-OFDM) symbol, the OFDM demodulated sequence of complex-valued modulation symbols by applying, for each DFTS-OFDM symbol, to a part of the OFDM demodulated sequence of complex-valued modulation symbols corresponding to that DFTS-OFDM symbol, a matrix comprising matrix elements, wherein the matrix elements are cyclically shifted depending on at least one of a DFTS-OFDM symbol index and a slot index;
block despreading the OFDM demodulated sequence of complex-valued modulation symbols, as transformed, with a despreading sequence; and
mapping the despread OFDM demodulated sequence of complex-valued modulation symbols to a block of bits.

9. The method according to claim 8, wherein cyclically shifting the matrix elements depends on cell ID.

10. A user equipment for transmitting uplink control information in time slots of a subframe over a radio channel to a radio base station, wherein the radio channel is configured to carry uplink control information, and wherein the uplink control information is comprised in a block of bits, the user equipment comprising:
a mapping circuit configured to map the block of bits to a sequence of complex-valued modulation symbols;
a block spreading circuit configured to block-spread the sequence of complex-valued modulation symbols across Discrete Fourier Transform Spread-Orthogonal Frequency Division Multiplexing (DFTS-OFDM) symbols by applying a spreading sequence to the sequence of complex-valued modulation symbols to achieve a block-spread sequence of complex-valued modulation symbols;
a transforming circuit configured to transform, per DFTS-OFDM symbol, the block-spread sequence of complex-valued modulation symbols by applying, for each DFTS-OFDM symbol, to a part of the block-spread sequence of complex-valued modulation symbols corresponding to that DFTS-OFDM symbol, a matrix comprising matrix elements, wherein the matrix elements are cyclically shifted depending on at least one of a DFTS-OFDM symbol index and a slot index; and
a transmitter configured to transmit the block-spread sequence of complex-valued modulation symbols, as transformed, over the radio channel to the radio base station.

11. The user equipment according to claim 10, wherein applying the matrix corresponds to performing a Discrete Fourier Transformation operation together with a cyclic shift operation.

12. The user equipment according to claim 10, further comprising:
an error correction coding circuit configured to error correction encode the block of bits, and
a scrambling circuit configured to scramble the block of bits before mapping the block of bits to the sequence of complex-valued modulation symbols.

13. The user equipment according to claim 10, further comprising an OFDM modulator configured to OFDM modulate, per DFTS-OFDM symbol, the block-spread sequence of complex-valued modulation symbols, as transformed.

14. The user equipment according to claim 10, wherein the transmitter is configured to transmit a first part of the sequence of complex-valued modulation symbols in a first time slot and a second part of the sequence of complex-valued modulation symbols in a second time slot.

15. The user equipment according to claim 10, wherein the block of bits corresponds to uplink control information and comprises jointly encoded acknowledgements and non-acknowledgements.

16. The user equipment according to claim 10, wherein cyclically shifting the matrix elements depends on cell ID.

17. A radio base station for receiving uplink control information in time slots of a subframe over a radio channel from a user equipment, wherein the radio channel is configured to carry uplink control information, and wherein the uplink control information is comprised in a block of bits, the radio base station comprising:
a receiver configured to receive a sequence of complex-valued modulation symbols;
an Orthogonal Frequency Division Multiplexing (OFDM) demodulating circuit configured to OFDM demodulate the sequence of complex-valued modulation symbols;
a transforming circuit configured to transform, per Discrete Fourier Transform Spread-Orthogonal Frequency Division Multiplexing (DFTS-OFDM) symbol, the OFDM demodulated sequence of complex-valued modulation symbols by applying, for each DFTS-OFDM symbol, to a part of the OFDM demodulated sequence of complex-valued modulation symbols corresponding to that DFTS-OFDM symbol, a matrix comprising matrix elements, wherein the matrix elements are cyclically shifted depending on at least one of a DFTS-OFDM symbol index and a slot index;
a block despreading circuit configured to block despread the OFDM demodulated sequence of complex-valued modulation symbols, as transformed, with a despreading sequence; and
a mapping circuit configured to map the despread OFDM demodulated sequence of complex-valued modulation symbols to a block of bits.

18. The radio base station according to claim 17, wherein cyclically shifting the matrix elements depends on cell ID.

* * * * *